(12) United States Patent
Teramura et al.

(10) Patent No.: US 7,423,761 B2
(45) Date of Patent: Sep. 9, 2008

(54) LIGHT SOURCE APPARATUS AND OPTICAL TOMOGRAPHY IMAGING APPARATUS

(75) Inventors: Yuichi Teramura, Kanagawa-ken (JP); Kiichi Kato, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/651,959

(22) Filed: Jan. 11, 2007

(65) Prior Publication Data
US 2007/0159639 A1 Jul. 12, 2007

(30) Foreign Application Priority Data
Jan. 11, 2006 (JP) ............... 2006-003459
Jul. 6, 2006 (JP) ............... 2006-186238

(51) Int. Cl.
G01B 9/02 (2006.01)
(52) U.S. Cl. .................... 356/479; 356/485
(58) Field of Classification Search ......... 356/477, 356/479, 497, 485; 250/227.19, 227.27; 359/618, 629, 639; 362/231; 385/12; 398/43
See application file for complete search history.

(56) References Cited
U.S. PATENT DOCUMENTS
6,392,751 B1 * 5/2002 Koch et al. ............ 356/478
6,570,659 B2 * 5/2003 Schmitt ................. 356/479
6,775,312 B2 * 8/2004 Wiedmann et al. ...... 372/50.1

FOREIGN PATENT DOCUMENTS
JP 06-165784 A 6/1994
JP 2002-214125 A 7/2002

OTHER PUBLICATIONS
Mitsuo Takeda, "Optical Frequency Scanning Interference Microscopes", Optics Engineering contact, vol. 41, No. 7, pp. 426-432, 2003 and its Partial English Translation.

* cited by examiner

Primary Examiner—Michael A Lyons
(74) Attorney, Agent, or Firm—Sughrue Mion, PLLC

(57) ABSTRACT

A light source apparatus is equipped with at least three light sources each having a predetermined wavelength interval and different central wavelengths. At least one multiplexing means having wavelength selectivity, for multiplexing light emitted from each of a first group and a second group of the light sources is provided, the first group of light sources including odd ordered light sources and the second group of light sources including even ordered light sources when counted in order of lengths of the central wavelengths thereof. Multiplexing means not having wavelength selectivity, for multiplexing light emitted from the first group of light sources and the second group of light sources is also provided.

7 Claims, 18 Drawing Sheets

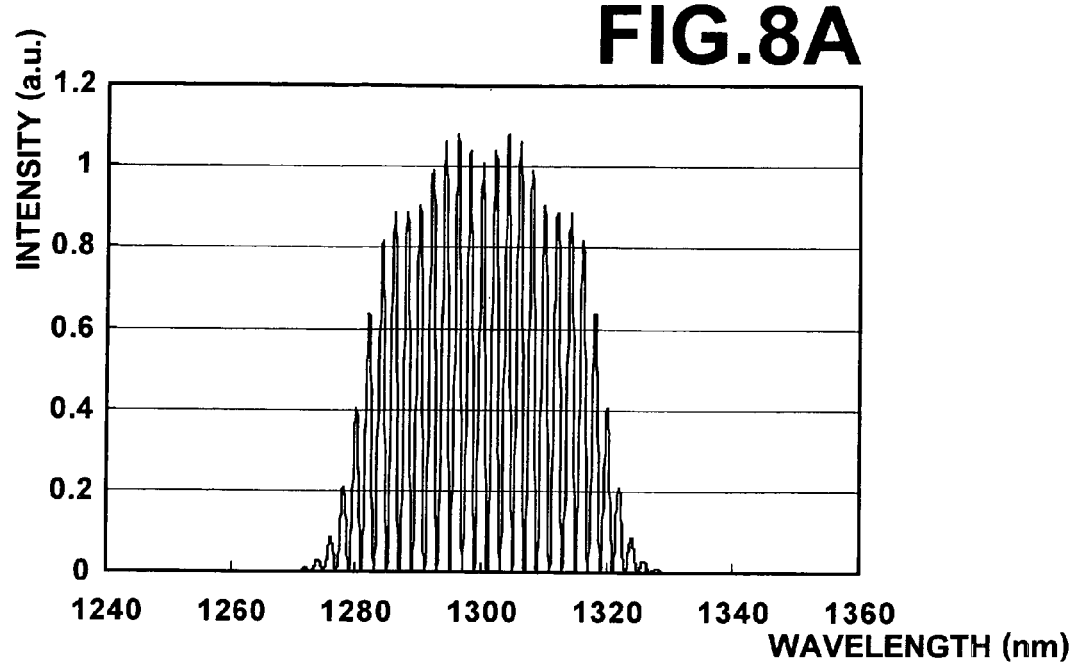
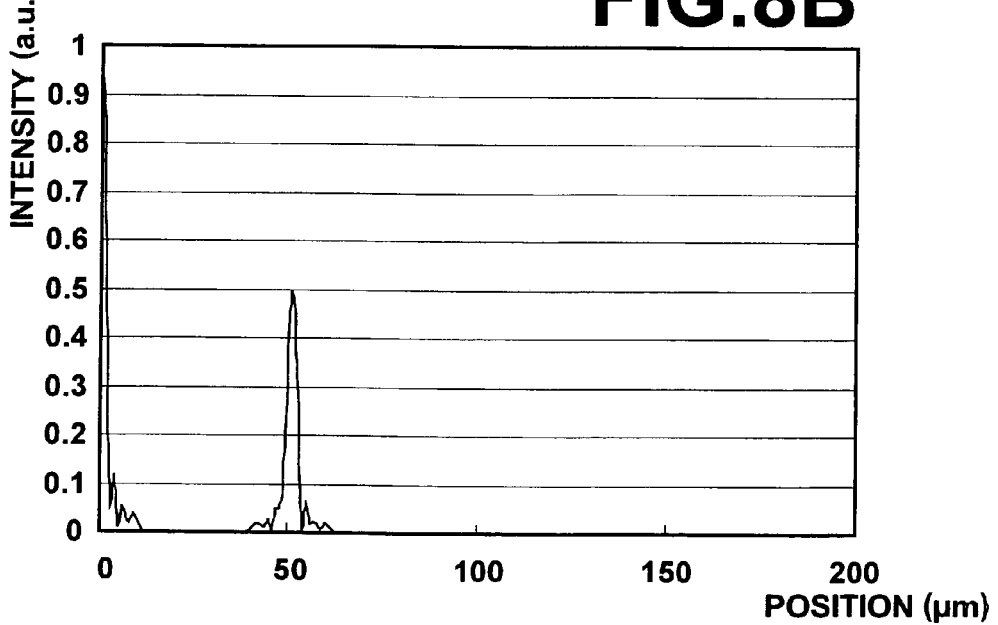

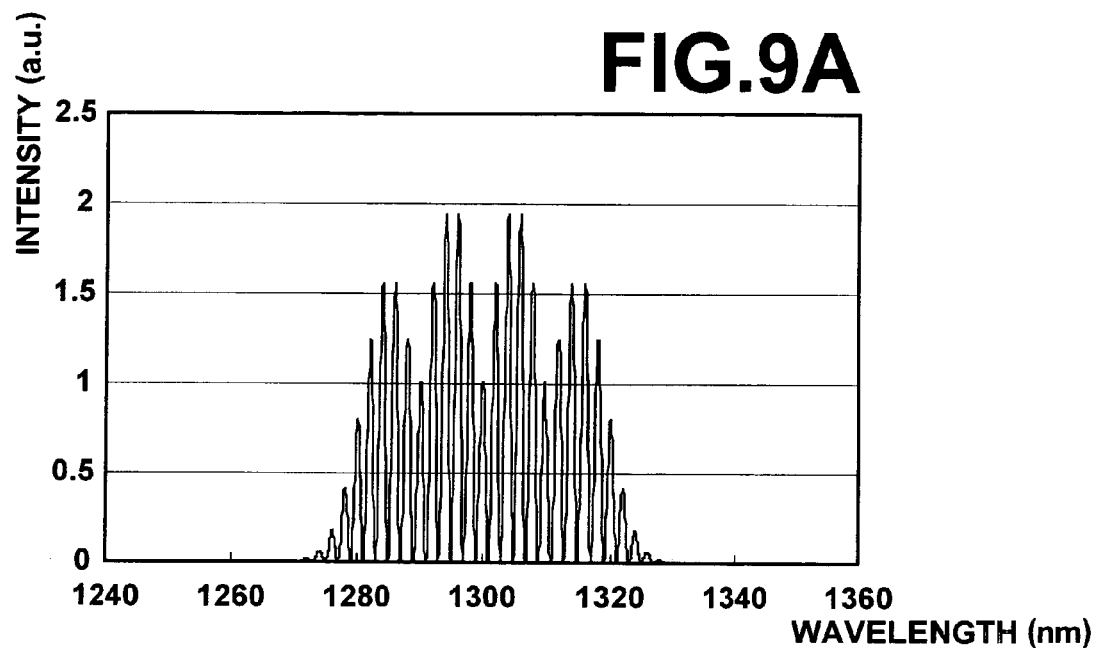
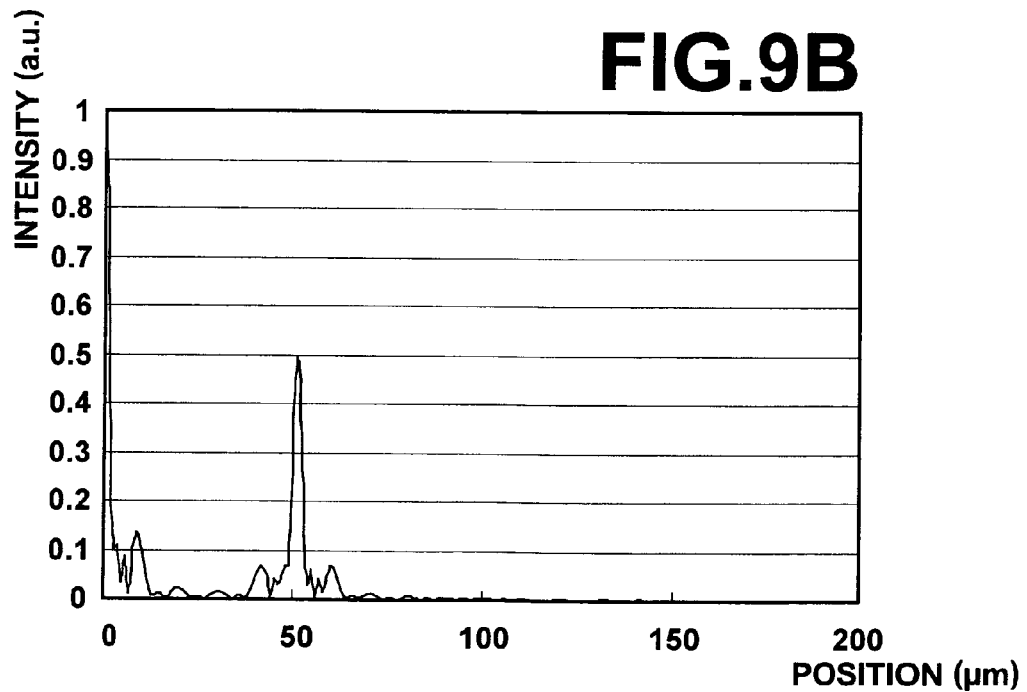

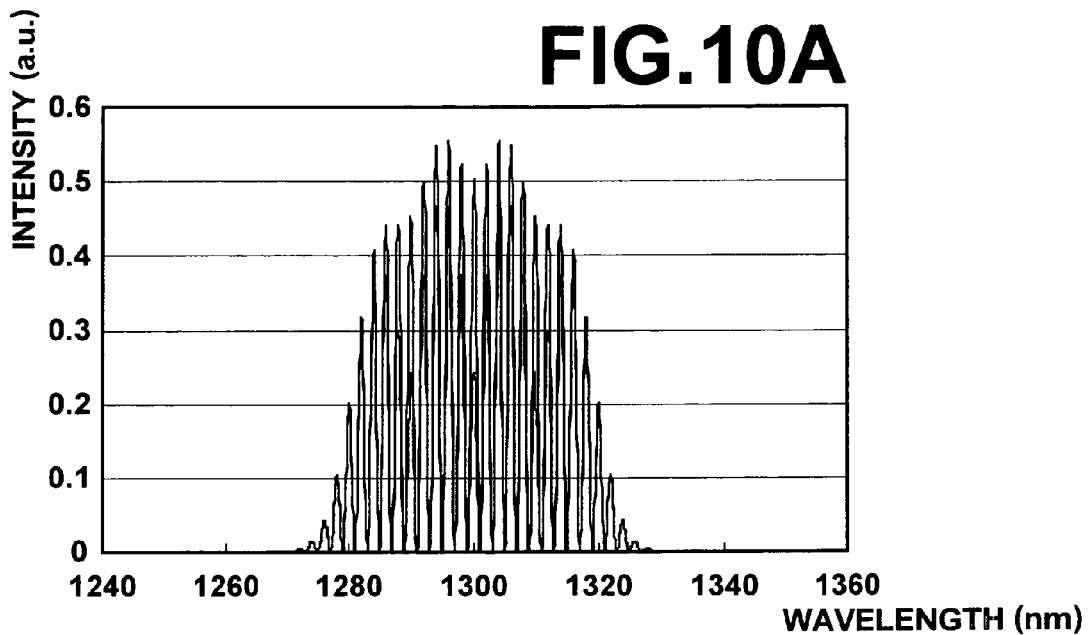
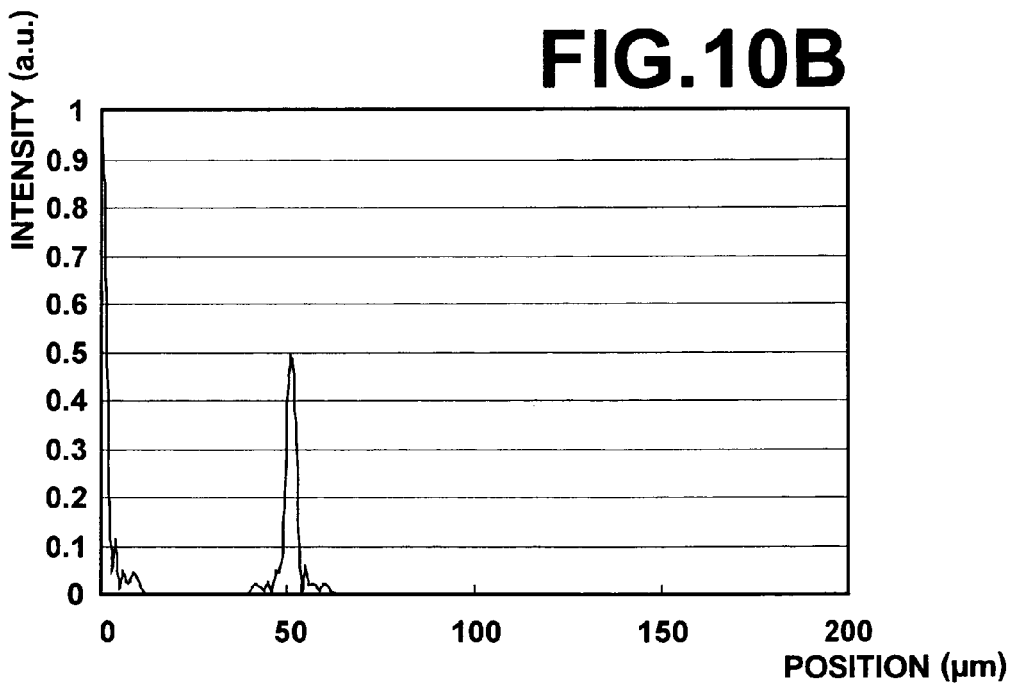

PRIOR ART

LIGHT SOURCE APPARATUS AND OPTICAL TOMOGRAPHY IMAGING APPARATUS

BACKGROUND OF THE INVENTION

1. Field of the Invention

The present invention relates to a light source that emits light, which is obtained by multiplexing light from a plurality of light sources. The present invention also relates to an optical tomography imaging apparatus, which is equipped with the light source, and obtains optical tomographic images by OCT (Optical Coherence Tomography) measurement.

2. Description of the Related Art

Conventionally, optical tomography imaging apparatuses that utilize OCT measurement are employed to obtain tomographic images of living tissue. In an optical tomography imaging apparatus, a low coherence light beam emitted from a light source is divided into a measuring light beam and a reference light beam. Thereafter, a reflected light beam, which is the measuring light beam reflected by a measurement target when the measuring light beam is irradiated onto the measurement target, is multiplexed with the reference light beam. Tomographic images are obtained, based on the intensity of a coherent light beam obtained by multiplexing the reflected light beam and the reference light beam.

There are some optical tomography imaging apparatuses that utilize TD-OCT (Time Domain OCT) measurement. In TD-OCT measurement, the measuring position in the depth direction (hereinafter, referred to as "depth position") within a measurement target is changed, by changing the optical path length of the reference light beam. Thereby, tomographic images can be obtained at different depth positions within measurement targets.

As another type of optical tomography imaging apparatus that can obtain tomographic images at high speed without changing the optical path of the reference light beam, optical tomography apparatuses that employ SD-OCT (Spectral Domain OCT) measurement have been proposed. In SD-OCT measurement, a wide band low coherence light beam is divided into a measuring light beam and a reference light beam by a Michelson interferometer. Then, the measuring light beam is irradiated onto a measurement target, and a reflected light beam, which is the measuring light beam reflected by the measurement target, is multiplexed with the reference light beam, to obtain a coherent light beam. Thereafter, the coherent light beam is decomposed into different frequency components. The channeled spectra of the decomposed coherent light beam undergoes Fourier analysis, and tomographic images are obtained without scanning in the depth direction.

In the aforementioned optical tomography imaging apparatuses, improvement of spatial resolution is an important objective. It is known that spatial resolution in the depth direction of measurement targets can be increased the wider the wavelength interval of a light source is. In addition, it is preferable for the light source to be a stable point light source, and for the spectrum, representing intensity distribution with respect to wavelengths of the emitted light, to approximate a graduated Gaussian distribution.

SLD's (Super Luminescent Diodes) are comparatively low cost, currently available point light sources that have wide wavelength intervals. However, if it is attempted to obtain a wavelength interval exceeding 100 nm with a single element, the spectrum of light emitted thereby becomes multi-peaked and unstable. It is necessary to narrow the wavelength interval to obtain a stable, single peaked spectrum.

Recently, optical tomography imaging apparatuses that employ a plurality of light sources having different wavelengths have been proposed. Japanese Unexamined Patent Publication No. 6 (1994)-165784 discloses an optical tomography imaging apparatus that simultaneously irradiates low coherence light from a plurality of light sources onto a measurement target, separates reflected light beams and reference light beams with filters having wavelength selectivity, and obtains coherent signals for each of the separated light beams.

Further, Japanese Unexamined Patent Publication No. 2002-214125 discloses a light source for optical tomography image measurement. This light source suppresses side lobes caused when multiplexing light emitted from a plurality of low coherence light sources having different wavelengths, due to the multiply peaked spectra thereof, by optimizing the parameters of each of the low coherence light sources.

Optical tomography imaging apparatuses such as those described above generally utilize light emitted from light source apparatuses by causing them to enter transmission single mode optical fibers. That is, multiplexed light beams obtained by multiplexing light from a plurality of light sources are also caused to enter optical fibers, and therefore it is necessary to match the optical axes of light beams emitted from each light source after being multiplexed. Due to this requirement, usable multiplexing means are limited, and conventionally, dichroic mirrors and half mirrors have been used. However, these multiplexing means have the following shortcomings, and improvements are desired.

First, multiplexing by dichroic mirrors will be described. FIG. 23 illustrates the configuration of a light source apparatus that employs three dichroic mirrors DM1, DM2, and DM3 to multiplex light emitted from four light sources SLD1, SLD2, SLD3, and SLD4. The light sources SLD1, SLD2, SLD3, and SLD4 each emit light having different central wavelengths. FIG. 24 is a graph that illustrates the spectra of light emitted by the light sources SLD1, through SLD4, and wavelength properties of the reflectance of the dichroic mirrors DM1, DM2, and DM3. Note that in FIG. 24 the graduation of the left vertical axis that represents intensity is different from that of the right vertical axis that represents reflectance. The cutoff wavelengths of the dichroic mirrors DM1, DM2, and DM3 are the intersection of the intensity curves of the light sources SLD1 and SLD2, the intersection of the intensity curves of the light sources SLD2 and SLD3, and the intersection of the intensity curves of the light sources SLD3 and SLD4, respectively.

In the configuration illustrated in FIG. 23, the light sources SLD2, SLD3, and SLD4 are provided such that the directions of light beams emitted therefrom are perpendicular to the direction of a light beam emitted from the light source SLD1. The dichroic mirrors DM1, DM2, and DM3 are provided at the intersection of the light beams emitted from the light sources SLD1 and SLD2, the intersection of the light beams emitted from the light sources SLD1 and SLD3, and the intersection of the light beams emitted from the light sources SLD1 and SLD4, respectively. The dichroic mirrors DM1, DM2, and DM3 are arranged so as to be disposed at a 45 degree angle with respect to the light beams emitted from all of the light sources SLD1, SLD2, SLD3, and SLD4. Light beams emitted from the light sources SLD1, through SLD4 are multiplexed by the dichroic mirrors DM1, DM2, and DM3. The obtained multiplexed light beam propagates along a single optical axis.

FIG. 25 is a graph that illustrates spectra of the multiplexed light beam obtained by multiplexing the light beams emitted from the light sources SLD1 through SLD4. In FIG. 25, the full width at half maximum w of the four light sources SLD1, SLD2, SLD3, and SLD4 are set to be 10 nm. Spectra are illustrated for each of a case in which intervals d between peak wavelengths of the four light sources SLD1 through SLD4 are set such that d/w=1.0, d/w=0.5, and d/w=2.

Multiplexing by dichroic mirrors as described above can reduce light loss due to the steep wavelength selectivity of the dichroic mirrors. However, the spectrum of the multiplexed light becomes multiple peaked, with a shape having concavities and convexities, as illustrated in FIG. 25. In the case that the spectrum is of a shape having concavities and convexities, the following problems occur.

In SD-OCT measurement, Fourier transform is administered on detected signals from a wave number space to a positional space, to generate signals that represent changes in reflectance over depth positions. FIG. 26A is a graph that illustrates the spectra of light beams emitted from light sources prior to multiplexing with broken lines and the spectrum of a multiplexed light beam obtained by dichroic. mirrors with a solid line, as a wave number function. FIG. 26B is a graph that illustrates the spectrum of the multiplexed light beam, on which Fourier transform has been administered, as a positional function. Note that the graduations of the horizontal axis of the graph of FIG. 26B are not equidistant. The spectrum of the multiplexed light beam is of a shape that has concavities and convexities, as illustrated in FIG. 26A. When Fourier transform is administered on such a spectrum, side lobes SL appear, as illustrated in FIG. 26B. In actual SD-OCT measurement, Fourier transform is administered on signals which are overlaps of OCT coherent signals on signals based on the spectrum of a measuring light beam. If side lobes such as the side lobes SL illustrated in FIG. 26B are present at this time, they appear to be the same as components that indicate that a reflective interface is present at a certain depth position. Therefore, the side lobes become noise with respect to reflection data, cause signals to become unclear, and deteriorate resolution.

The differences between the peaks and bottoms of the concavities and convexities of a spectrum are determined by the wavelength intervals and the central wavelength intervals of the light sources SLD1 through SLD4. If the central wavelength intervals are reduced, the differences between the peaks and bottoms decrease, thereby enabling reduction of the concavities and convexities of the spectrum. However, the wavelength intervals cannot be broadened, precluding achievement of the original objective.

In order to solve the above problem, insertion of filters having wavelength selectivity into the optical path of the multiplexed light beam to smooth the spectrum, may be considered. However, the wavelength properties of the filters will be complex, and therefore this solution is impractical.

Next, multiplexing by half mirrors will be described. FIG. 27 illustrates the configuration of a light source apparatus that employs three half mirrors HM1, HM2, and HM3 to multiplex light emitted from four light sources SLD1, SLD2, SLD3, and SLD4. The light sources SLD1, SLD2, SLD3, and SLD4 each emit light having different central wavelengths.

As illustrated in FIG. 27, the light sources SLD1 and SLD3 are provided such that the directions of light beams emitted therefrom are perpendicular to each other. The half mirror HM1, which is provided at the intersection of the light beams emitted from the light sources SLD1 and SLD3, and arranged to be disposed at a 45 degree angle with respect to both of the two light beams, multiplexes the two light beams. The multiplexed light beam enters the half mirror HM3. Similarly, the half mirror HM2 multiplexes light beams emitted from the light sources SLD2 and SLD4, and the multiplexed light beam enters the half mirror HM3. The multiplexed light beam, which has been multiplexed by the half mirror HM1, and the multiplexed light beam, which has been multiplexed by the half mirror HM2, are multiplexed by the half mirror HM3. The obtained multiplexed light beam propagates along a single optical axis.

FIG. 28A is a graph that illustrates the spectra of light beams emitted from the four light sources SLD1 through SLD4 prior to multiplexing with broken lines and the spectrum of the multiplexed light beam with a solid line, as a wave number function. The spectrum of the multiplexed light beam is smooth, as illustrated in FIG. 28A. When Fourier transform is administered on this spectrum, slide lobes do not appear, as illustrated in FIG. 28B.

However, the transmissivity of each half mirror is 50%, and therefore there is a problem that the amount of light loss is great. As the number of light sources to be multiplexed increases, the number of times that light beams emitted from the light sources pass through the half mirrors increases, and the amount of light which is ultimately usable decreases. For example, in the configuration illustrated in FIG. 27, light beams emitted from all of the light sources SLD1 through SLD4 pass through two half mirrors. Therefore, the ultimately usable amount of light is 25% of the light emitted from the light sources, which is extremely inefficient.

SUMMARY OF THE INVENTION

The present invention has been developed in view of the foregoing circumstances. It is an object of the present invention to provide a light source apparatus that enables highly efficient obtainment of light beams having smooth, wide bandwidth spectra, by multiplexing light beams from a plurality of light sources. It is another object of the present invention to provide an optical tomography imaging apparatus equipped with the light source.

The light source apparatus of the present invention comprises:

at least three light sources each having a predetermined wavelength interval and different central wavelengths;

at least one multiplexing means having wavelength selectivity, for multiplexing light beams emitted from each of a first group and a second group of the light sources, the first group of light sources including odd ordered light sources and the second group of light sources including even ordered light sources when counted in order of lengths of the central wavelengths thereof; and multiplexing means not having wavelength selectivity, for multiplexing light beams emitted from the first group of light sources and light beams emitted from the second group of light sources.

Note that "having a predetermined wavelength interval" means that a spectrum, in which intensity is expressed as a function of wavelength, has a predetermined wavelength interval. An example of the "predetermined wavelength interval" is a full width at half maximum of 5 nm or greater.

The phrase "not having wavelength selectivity" does not refer to a case in which the multiplexing means does not have wavelength selectivity across the entire wavelength region, but that the multiplexing means does not have wavelength selectivity with respect to the wavelengths of light emitted by the at least three light sources.

In addition, the phrase "odd ordered light sources ... when counted in order of lengths of the central wavelengths" refers to light sources which are numbered 1, 3, 5 ... when numbers are assigned to the at least three light sources in ascending or descending order, based on the lengths of the central wavelengths thereof.

That is, the present invention divides the at least three light sources into two groups such that light sources within the same group are not adjacent to each other in the order of the lengths of the central wavelengths thereof. The light beams emitted by the plurality of light sources within each of the two groups are multiplexed by the multiplexing means having wavelength selectivity, and a single multiplexed light beam is emitted for each group. The light beam emitted from the first group and the light beam emitted from the second group, that is, light beams of different groups, are multiplexed by the multiplexing means not having wavelength selectivity.

It is preferable for the spectrum of the light beam emitted by each of the light sources to be single peaked; and for the full widths at half maximum (w) of the emitted light beams and intervals (d) between the peak wavelengths of two light sources which are adjacent to each other in the aforementioned order to satisfy the relationship: $1 \leq d/w \leq 1.2$ The multiplexing means having wavelength selectivity may be one of a dichroic mirror, a dichroic prism, a diffracting optical element, and a WDM coupler. The multiplexing means not having wavelength selectivity may be one of a half mirror, a half prism, and an optical coupler. The multiplexing means not having wavelength selectivity may alternatively be that which multiplexes light beams having perpendicular directions of polarization, such as a polarizing mirror, a polarizing prism, and a polarization preserving optical coupler.

The light sources may be provided such that the intensities of the light beams emitted from the light sources at the peak wavelengths thereof become greater toward the center of the order in which they are counted and arranged.

The optical tomography imaging apparatus of the present invention comprises:

The aforementioned light source apparatus;

light dividing means, for dividing a light beam emitted from the light source apparatus into a measuring light beam and a reference light beam;

multiplexing means, for multiplexing a reflected light beam, which is the measuring light beam reflected by a measurement target, and the reference light beam, to obtain a coherent light beam;

coherent light detecting means, for detecting the coherent light beam obtained by the multiplexing means; and image obtaining means, for obtaining tomographic images of the measurement target, based on the coherent light beam detected by the coherent light detecting means.

The light source apparatus of the present invention divides the at least three light sources, each having a different central wavelength, into a first group of odd ordered light sources and a second group of even ordered light sources in the order of the lengths of the central wavelengths thereof. The light beams emitted by the plurality of light sources within each of the two groups are multiplexed by the multiplexing means having wavelength selectivity, and a single multiplexed light beam is emitted for each group. That is, in the light source apparatus of the present invention, light beams emitted from light sources, which are not adjacent to each other in the order of the lengths of the central wavelengths thereof, are multiplexed by the multiplexing means having wavelength selectivity.

Commonly, multiplexing means having wavelength selectivity utilize transmissivity and reflectivity according to wavelengths to multiplex light beams, and are capable of highly efficient multiplexing. Utilization of wavelength selectivity is particularly facilitated when the spectra of light beams to be multiplexed are far apart from each other, and higher efficiency multiplexing becomes possible. In the present invention, the multiplexing means having wavelength selectivity is employed to multiplex light beams emitted by light sources, which are not adjacent to each other in the order of the lengths of the central wavelengths thereof. Therefore, the spectra of the light beams are further apart than in a case in which light beams emitted by light sources, which are adjacent to each other in the order of the lengths of the central wavelengths thereof, are multiplexed. Accordingly, high efficiency multiplexing can be performed.

The spectrum of the light beam multiplexed by the multiplexing means having wavelength selectivity is highly efficient. Therefore, the shape of the spectrum is greatly influenced by the spectra of each of the light beams prior to multiplexing, and may be of a shape having large concavities and convexities. Therefore, the light source of the present invention multiplexes the light beams emitted from the first group and the second group of light sources with the multiplexing means not having wavelength selectivity. As a result, the spectrum of the ultimately obtained multiplexed light beam approaches a smooth shape. This is due to convexities and concavities of the $2^{nd}$, $4^{th}$, $6^{th}$, ... light sources overlapping with the concavities and convexities of the $1^{st}$, $3^{rd}$, $5^{th}$, ... light sources. It is often the case that light loss is a feature of multiplexing means not having wavelength selectivity. However, in the case that light loss occurs, the steepness of the concavities and convexities of the spectra of light beams emitted from each light source is reduced, and the spectrum of the ultimately obtained multiplexed light beam becomes smoother. Note that in the light source of the present invention, the multiplexing means not having wavelength selectivity, in which the possibility of light loss is present, is used only for one multiplexing operation. Therefore, the multiplexing performed in the light source apparatus of the present invention is more efficient than conventional light source apparatuses that employ half mirrors to perform all multiplexing operations.

The light source apparatus of the present invention multiplexes light beams emitted from at least three light sources, each having a predetermined wavelength interval and different central wavelengths. Therefore, the spectrum of the ultimately obtained multiplexed light beam has a wide wavelength interval. It is preferable for the spectrum of the light beam emitted by each of the light sources to be single peaked; and for the full widths at half maximum (w) of the emitted light beams and intervals (d) between the peak wavelengths of two light sources which are adjacent to each other in the aforementioned order to satisfy the relationship: $1 \leq d/w$. In this case, the full width at half maximum of the multiplexed light beam becomes (full width at half maximum of each light source)×(number of light sources), and the multiplexed light beam will have a wide wavelength bandwidth. In addition, if d and w satisfy the relationship: $d/w \leq 1.2$, side lobes after Fourier transform can be suppressed to −10 dB or less, as will be described later. Accordingly, if this light source apparatus is applied to OCT measurement, noise can be reduced, and high resolution optical tomographic images can be obtained.

In the case that the multiplexing means having wavelength selectivity is a dichroic mirror, or a dichroic prism, the light source apparatus can be constituted by inexpensive and common parts. In the case that the multiplexing means having wavelength selectivity is a diffracting optical element, the light source apparatus can be constituted by an inexpensive part which can be mass produced. In the case that the multiplexing means having wavelength selectivity is a WDM coupler, the light source apparatus will be superior in stability with respect to environmental changes, compared to cases in which mirrors or the like are employed to multiplex the light beams.

In the case that the multiplexing means not having wavelength selectivity is a half mirror or a half prism, the light source apparatus can be constituted by inexpensive and common parts. In the case that the multiplexing means not having wavelength selectivity is that which multiplexes light beams having perpendicular directions of polarization, such as a polarizing mirror and a polarizing prism, highly efficient multiplexing becomes possible, by appropriately setting the polarization directions of the light beams to be multiplexed. In the case that the multiplexing means not having wavelength selectivity is an optical coupler, the light source apparatus will be superior in stability with respect to environmental changes, compared to cases in which mirrors or the like are employed to multiplex the light beams.

The light sources may be provided such that the intensities of the light beams emitted from the light sources at the peak wavelengths thereof become greater toward the center of the order in which they are counted and arranged. In this case, the shape of the spectrum of the multiplexed light beam can approximate the shape of a Gaussian distribution. Accordingly, if the light source apparatus is applied to OCT measurement, noise can be reduced, and high resolution optical tomographic images can be obtained.

The optical tomography imaging apparatus of the present invention is equipped with the light source apparatus of the present invention. Therefore, measurement using a wide bandwidth light beam, which has been highly efficiently multiplexed and which has a smooth spectrum, is enabled, and high resolution optical tomographic images can be obtained.

BRIEF DESCRIPTION OF THE DRAWINGS

FIG. 8A is a graph that illustrates coherent signals obtained by the light source apparatus of FIG. 2.

FIG. 8B is a graph that illustrates FT signals, which are the results of Fourier transform on the coherent signals of FIG. 8A.

FIG. 9A is a graph that illustrates coherent signals obtained by conventional dichroic mirror multiplexing.

FIG. 9B is a graph that illustrates FT signals, which are the results of Fourier transform on the coherent signals of FIG. 9A.

FIG. 10A is a graph that illustrates coherent signals obtained by conventional half mirror multiplexing.

FIG. 10B is a graph that illustrates FT signals, which are the results of Fourier transform on the coherent signals of FIG. 10A.

BEST MODE FOR CARRYING OUT THE INVENTION

Figure 1:
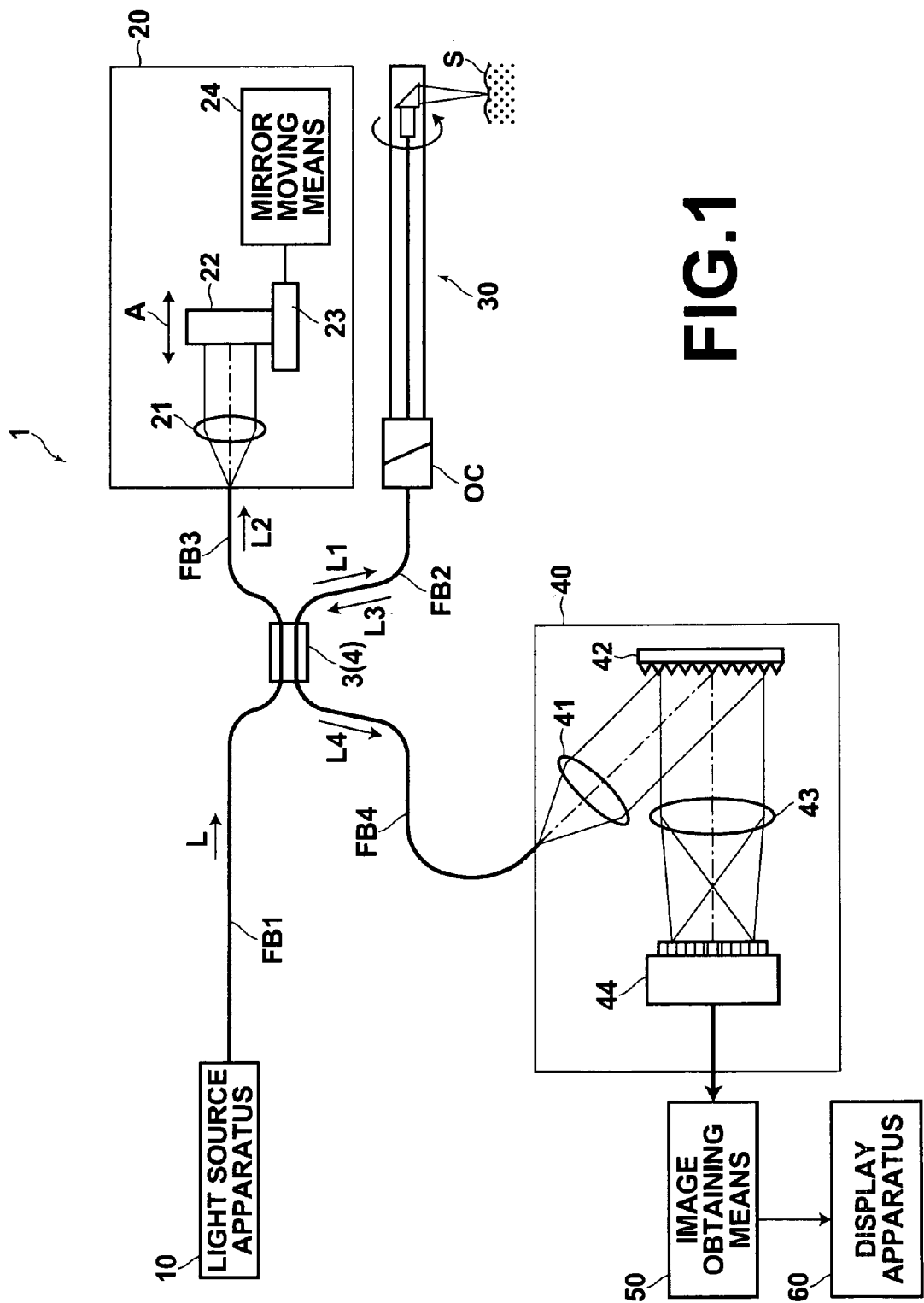
FIG. 1 is a schematic diagram that illustrates the construction of an optical tomography imaging apparatus according to a first embodiment of the present invention.

Hereinafter, embodiments of the light source apparatus of the present invention and the optical tomography imaging apparatus equipped with the light source will be described in detail with reference to the accompanying drawings. Note that in the following description, the optical tomography imaging apparatus will be described first, and then the details of the light source apparatus will be described. FIG. 1 is a schematic diagram that illustrates the construction of an optical tomography imaging apparatus 1 according to a first embodiment of the present invention. The optical tomography imaging apparatus 1 obtains tomographic images of measurement targets, such as tissue within body cavities and cells, by SD-OCT measurement employing a Michelson interferometer. The optical tomography imaging apparatus 1 comprises: a light source apparatus 10 for emitting a light beam L; a light dividing means 3, for dividing the light beam L into a measuring light beam L1 and a reference light beam L2; an optical path length adjusting means 20, for adjusting the optical path length of the reference light beam L2; a probe 30 that irradiates the measuring light beam L1 onto a measurement target S; a multiplexing means 4, for multiplexing a reflected light beam L3, which is the measuring light beam L1 reflected from the measurement target S, and the reference light beam L2; a coherent light detecting means 40, for detecting a coherent light beam L4, formed by multiplexing the reflected light beam L3 and the reference light beam L2; and an image obtaining means 50, for obtaining a tomographic image of the measurement target S by administering frequency analysis on the coherent light beam L4 detected by the coherent light detecting means 40.

The light source apparatus 10 comprises: a plurality of light sources; multiplexing means for multiplexing light beams emitted from the plurality of light sources; and an optical system for causing a multiplexed light beam to enter an optical fiber FB1. The detailed structure of the light source apparatus 10 will be described later. The optical tomography imaging apparatus 1 of the present embodiment obtains tomographic images of living tissue within body cavities as the measurement target S. Accordingly, light sources that minimize attenuation of light due to dispersion and absorption, when the light beam passes through the measurement target S, are selected as the light sources of the light source apparatus 10.

The light dividing means 3 is constituted by a 2×2 optical fiber coupler, for example. The light dividing means 3 functions to divide the light beam L, emitted by the light source apparatus 10 and guided through the optical fiber FB1, into a measuring light beam L1 and a reference light beam L2. The light dividing means 3 is optically connected to optical fibers FB2 and FB3. The measuring light beam L1 is guided through the optical fiber FB2, and the reference light beam L2 is guided through the optical fiber FB3. Note that the light dividing means 3 of the present embodiment also functions as the multiplexing means 4.

The probe 30 is optically connected to the optical fiber FB2, and the measuring light beam is guided to the probe 30 via the optical fiber FB2. The probe 30 is to be inserted into body cavities via a forceps opening and a forceps channel, and is removably mounted to the optical fiber FB2 with an optical connector OC.

The optical path length adjusting means 20 is provided at the end of the optical fiber FB3 at which the reference light beam L2 is emitted. The optical path length adjusting means 120 functions to change the optical path length of the reference light beam L2, to adjust the measuring position within the measurement target S. The optical path length adjusting means 220 comprises: a collimating lens 21; and a mirror 22. The reference light beam L2 emitted from the optical fiber FB3 passes through the collimating lens 21, is reflected by the mirror 22, and reenters the optical fiber FB3 via the collimating lens 21.

The optical path length adjusting means 20 further comprises: a movable stage 23, on which the mirror 22 is fixed; and a mirror moving means 24, for moving the movable stage 23 in the direction indicated by arrow A. The optical path length of the reference light beam L2 is varied, by moving the movable stage 23 in the direction indicated by arrow A.

The multiplexing means 4 is constituted by the aforementioned 2×2 optical coupler. The multiplexing means 4 multiplexes the reference light beam L2, of which the optical path length has been adjusted by the optical path length adjusting means 20, and the reflected light beam L3 reflected by the measurement target S. The multiplexed coherent light beam L4 is emitted toward the coherent light detecting means 140 via an optical fiber FB4.

The coherent light detecting means 40 detects the coherent light beam L4 obtained by multiplexing the reflected light beam L3 and the reference light beam L2, and measures the intensity thereof. The coherent light detecting means 40 comprises: a collimating lens 41, for collimating the coherent light beam L4 emitted from the optical fiber FB4; a spectral decomposing means 42, for decomposing the coherent light beam L4 into each of its constituent wavelength bands; an optical system 43, for focusing the coherent light beam L4 of each wavelength band, decomposed by the spectral decomposing means 42; and a photo detecting means 44, for detecting each wavelength band of the coherent light beam L4 focused by the optical system 43.

The spectral decomposing means 42 is constituted by a diffraction grating element or the like. The spectral decomposing means 42 decomposes the coherent light beam L4 incident thereon, and emits the decomposed components toward the photo detecting means 44. The photodetecting means 44 is constituted by CCD (Charged Coupled Device) elements or the like, in which optical sensors are arranged one dimensionally or two dimensionally. Each of the optical sensors is configured to detect each wavelength band component of the spectrally decomposed coherent light beam L4, respectively.

The photodetecting means 44 is connected to the image obtaining means 50, which is constituted by a computer system such as a personal computer. The image obtaining means 50 is connected to a display apparatus 60, constituted by a CRT display or an LCD. The image obtaining means 50 obtains reflection data at a given depth position by administering frequency analysis on the coherent light beam L4 detected by the coherent light detecting means 40. The image obtaining means obtains tomographic images of the measurement target S by employing the intensity of the reflected light beam L3 at each depth position, and displays the tomographic images on the display apparatus 60.

Here, detection of the coherent light beam L4 by the coherent light detecting means 40 and image generation by the image obtaining means 50 will be described briefly. Note that a detailed description of these two points can be found in M. Takeda, "Optical Frequency Scanning Interference Microscopes", Optics Engineering Contact, Vol. 41, No. 7, pp. 426-432, 2003.

When the measuring light beam L1 is irradiated onto the measurement target S, the reflected light beams L3, which are reflected at various depths within the measurement target S and the reference light beam L2 interfere with each other, with various optical path length differences. By designating the optical intensity of the interference pattern with respect to each of the optical path length differences l as S(l), the optical intensity I(k) detected by the coherent light detecting means 40 can be expressed as:

$$I(k) = \int_0^\infty S(l)[1+\cos(kl)]dl \quad (1)$$

wherein:
k: wave number
l: optical path length difference

Formula (1) above may be considered as being provided as an interferogram of an optical frequency range, in which the wave number k is a variable. For this reason, the image obtaining means 50 administers Fourier transform on the spectral interference pattern detected by the coherent light detecting means 40, to determine the optical intensity (I) of the coherent light beam L4. Thereby, data regarding the intensity of the reflected light beam can be obtained, and generation of tomographic images is enabled. The generated tomographic images are displayed on the display apparatus 60.

Next, the operation of the optical tomography apparatus 1 of the above construction will be described. When obtaining a tomographic image, first, the movable stage 23 is moved in the direction of arrow A, to adjust the optical path length such that the measurement target S is positioned within a measurable region. Thereafter, the light beam L is emitted from the light source apparatus 10. The light beam L is divided into the measuring light beam L1 and the reference light beam L2 by the light dividing means 3. The measuring light beam L1 is emitted within the body cavity from the optical probe 30, and irradiated on the measurement target S. The reflected light beam L3, which is the measuring light beam L1 reflected by the measurement target S, is multiplexed with the reference light beam L2, which is reflected by the mirror 22, to form the coherent light beam L4. The coherent light beam L4 is detected by the coherent light detecting means 40. Then, a tomographic image is obtained by the image obtaining means 50 administering frequency analysis on the detected coherent light beam L4. In this manner, the optical tomography imaging apparatus 1 that employs the SD-OCT measurement method obtains image data for each depth position, based on the frequency and the optical intensity of the coherent light beam L4. Movement of the mirror 22 in the direction of arrow A is employed to adjust the depth position within the measurement target at which tomographic image signals are obtained.

The measuring light beam L1 may be scanned one dimensionally by rotating the probe 30, for example. In this case, data can be obtained regarding portions of the measurement targets along the scanning direction. Therefore, tomographic images can be obtained of a plane that includes the scanning direction. Note that it is also possible to obtain tomographic images of a plane that includes a second scanning direction perpendicular to the aforementioned scanning direction, by scanning the measuring light beam L1 in the measurement target S along the second scanning direction.

Figure 2:
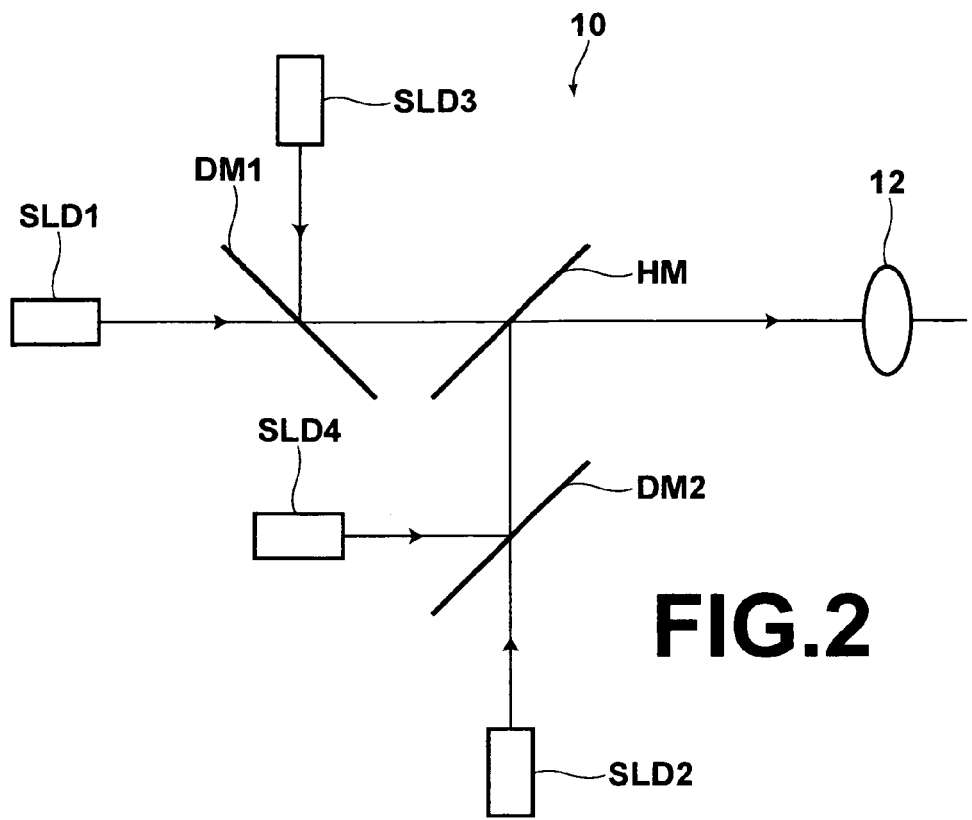
FIG. 2 is a schematic view that illustrates an example of the configuration of a light source apparatus of the optical tomography imaging apparatus of FIG. 1.

Hereinafter, the light source apparatus 10 of the present embodiment will be described. FIG. 2 is a schematic view that illustrates an example of the configuration of the light source apparatus 10. The light source apparatus 10 illustrated in FIG. 2 comprises: four light sources SLD1, SLD2, SLD3, and SLD4; two dichroic mirrors DM1 and DM2; a half mirror HM; and an optical system 12.

Figure 3:
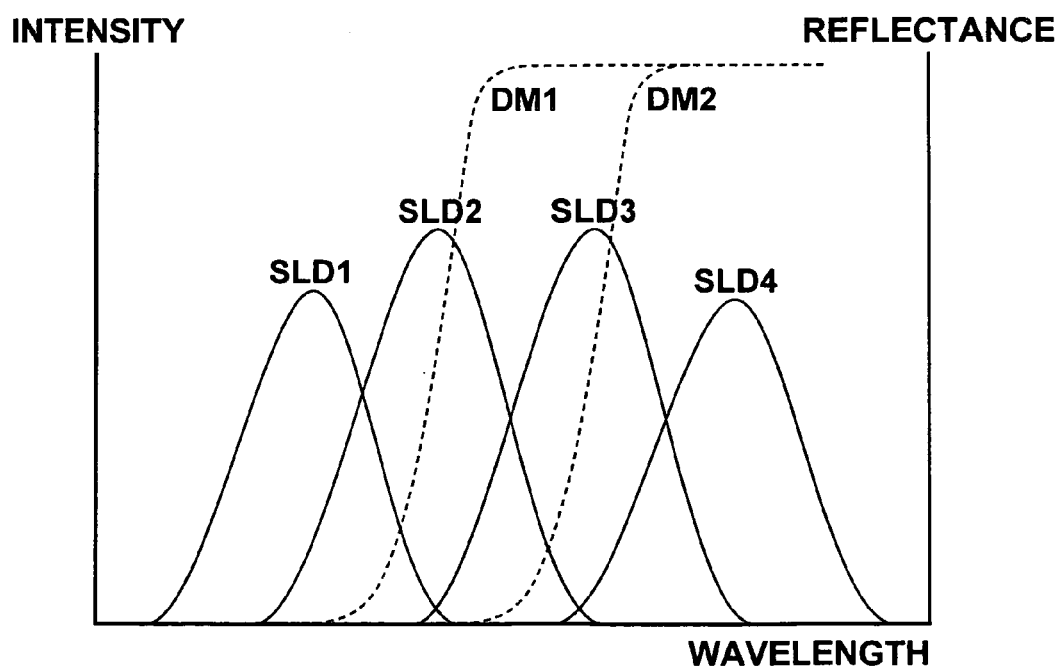
FIG. 3 is a graph that illustrates the spectrum of light emitted from each light source of the light source apparatus of FIG. 2.

The light sources SLD1 through SLD4 are low coherence light sources, and are SLD's (Super Luminescent Diodes) each having a different central wavelength. FIG. 3 is a graph that illustrates the spectrum of light emitted from each of the light sources SLD1, SLD2, SLD3, and SLD4. As illustrated in FIG. 3, each of the light sources SLD1 through SLD4 has a single peaked spectrum with a Gaussian distribution, and the lengths of the central wavelengths thereof increase from the light source SLD1 to the light source SLD4. In addition, the light sources are provided such that the intensities of the light beams emitted therefrom at the peak wavelengths thereof become greater toward the center of the order of the lengths of the central wavelengths. Specifically, the intensities of the light beams emitted by the light sources SLD1 and SLD4 at the peak wavelengths thereof are 80% the intensities of the light beams emitted by the light sources SLD2 and SLD3 at the peak wavelengths thereof.

The dichroic mirrors DM1 and DM2 reflect light of predetermined wavelengths, and transmit light having wavelengths other than the predetermined wavelengths. Therefore, the dichroic mirrors DM1 and DM2 function as multiplexing means having wavelength selectivity. The wavelength properties of the reflectance of the dichroic mirrors DM1 and DM2 are illustrated by broken lines in the graph of FIG. 3. The cutoff wavelengths of the dichroic mirrors DM1 and DM2 are set to a wavelength between the peak wavelength of the light sources SLD1 and SLD3, and a wavelength between the peak wavelength of the light sources SLD2 and SLD4, respectively. Note that FIG. 3 qualitatively illustrates the spectra of light beams and the wavelength properties of reflectance, and therefore the graduation of the left vertical axis that represents intensity is different from that of the right vertical axis that represents reflectance.

The transmissivity and the reflectance of the half mirror HM are 50%, regardless of wavelength. Therefore, the half mirror HM functions as a multiplexing means not having wavelength selectivity.

In the light source apparatus 10 illustrated in FIG. 2, the light sources SLD1 and SLD3, which are odd numbered in the order of lengths of central wavelengths, are provided such that the directions of light beams emitted thereby are perpendicular to each other. The dichroic mirror DM1 is provided at the intersection of the light beams emitted from the light sources SLD1 and SLD3 such that it is disposed at a 45 degree angle with respect to both of the light beams. The reflectance properties of the dichroic mirror DM1 with respect to light incident thereto at a 45 degree angle are as is illustrated in FIG. 3. Accordingly, the light beam emitted by the light source SLD1 passes through the dichroic mirror DM1, while the light beam emitted by the light source SLD3 is reflected by the dichroic mirror DM1 and to have the propagating path thereof deflected 90 degrees. Thereby, the two light beams are multiplexed, propagate along the same optical axis, and enter the half mirror HM.

Similarly, the light sources SLD2 and SLD4, which are even numbered in the order of lengths of central wavelengths, are provided such that the directions of light beams emitted thereby are perpendicular to each other. The dichroic mirror DM2 is provided at the intersection of the light beams emitted from the light sources SLD1 and SLD3 such that it is disposed at a 45 degree angle with respect to both of the light beams. The reflectance properties of the dichroic mirror DM2 with respect to light incident thereto are as is illustrated in FIG. 3. Accordingly, the light beam emitted by the light source SLD2 passes through the dichroic mirror DM2, while the light beam emitted by the light source SLD4 is reflected by the dichroic mirror DM2 to have the propagating path thereof deflected 90 degrees. Thereby, the two light beams are multiplexed, propagate along the same optical axis, and enter the half mirror HM.

The light sources SLD1 through SLD4 and the dichroic mirrors DM1 and DM2 are provided such that light beams multiplexed by the dichroic mirrors DM1 and DM2 intersect each other perpendicularly. The half mirror HM is provided at the intersection of the multiplexed light beams such that it is disposed at a 45 degree angle with respect to both multiplexed light beams. 50% of the light beam multiplexed by the dichroic mirror DM1 passes through the half mirror HM, and 50% of the light beam multiplexed by the dichroic mirror DM2 is reflected by the half mirror HM to have the propagating path thereof deflected 90 degrees. Thereby, the two multiplexed light beams are multiplexed. The ultimately multiplexed light beam propagates along a single optical axis, is focused by the optical system 12, and enters the optical fiber FB1.

As described above, the light source apparatus 10 groups the four light sources into a first group consisting of the light sources SLD1 and SLD3, and a second group consisting of the light sources SLD2 and SLD4. Light sources, which are not adjacent to each other in the order of the lengths of the central wavelengths thereof, are grouped together, and light beams emitted thereby are multiplexed by the dichroic mirrors. Light beams emitted from the two groups are then multiplexed by the half mirror HM.

Figure 4:
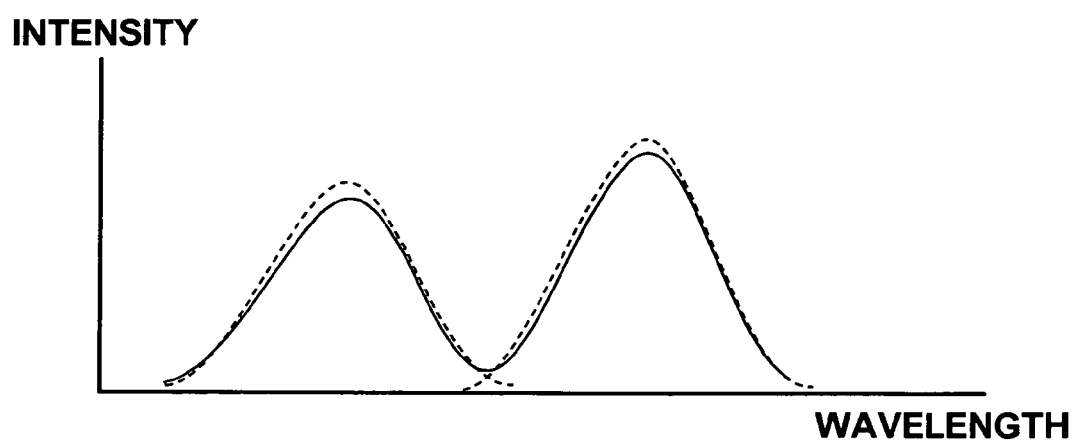
FIG. 4 is a graph that illustrates spectra of light beams emitted from two of the light sources of the light source apparatus of FIG. 2, and the spectrum of a light beam obtained by multiplexing the two light beams.
Figure 5:
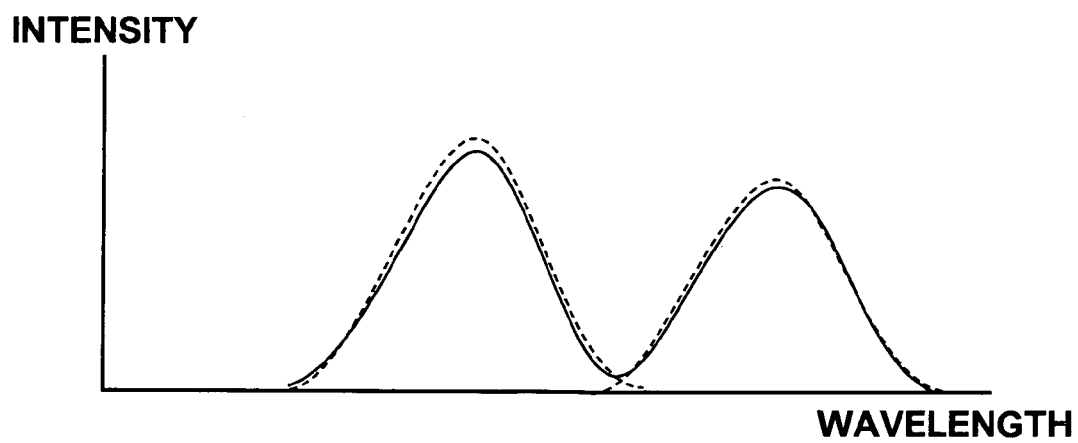
FIG. 5 is a graph that illustrates the spectra of light beams emitted from two of the light sources of the light source apparatus of FIG. 2, and the spectrum of a light beam obtained by multiplexing the two light beams.
Figure 6A:
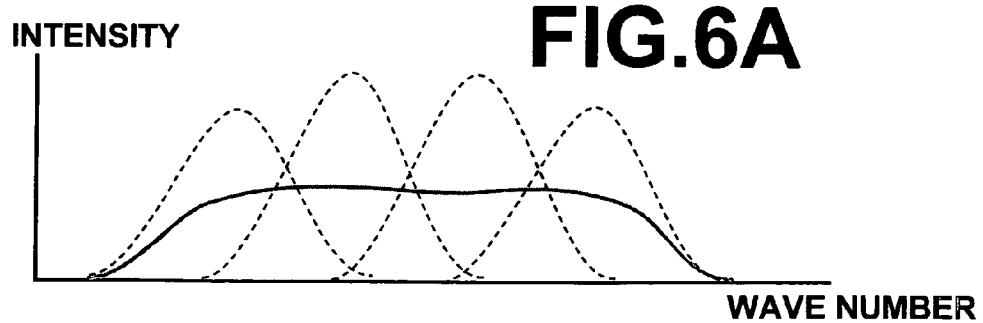
FIG. 6A is a graph that illustrates spectra of light beams emitted from each of the light sources of the light source apparatus of FIG. 2, and the spectrum of a light beam obtained by multiplexing the light beams.
Figure 6B:
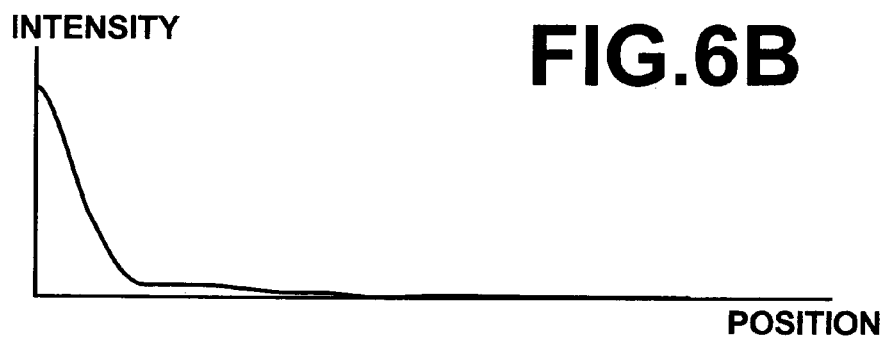
FIG. 6B is a graph that illustrates the result of Fourier transform of the spectrum illustrated in FIG. 6A.
Figure 26A:
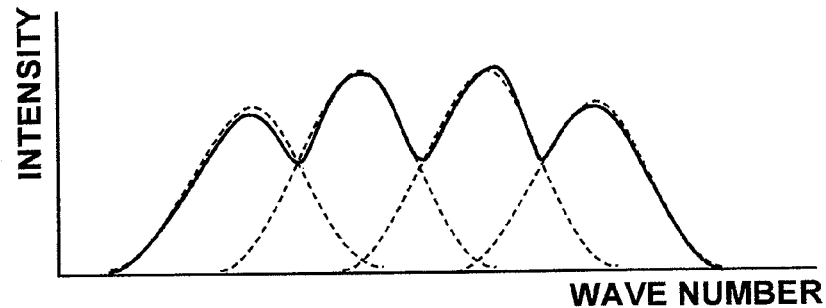
FIG. 26A is a graph that illustrates the spectra of light beams emitted from each of the light sources of the light source apparatus of FIG. 23, and the spectrum of a light beam multiplexed thereby.
Figure 26B:
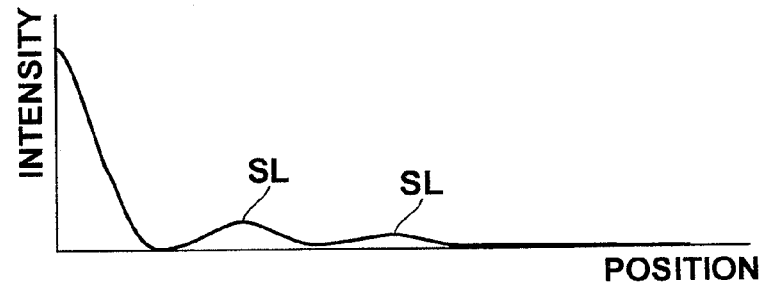
FIG. 26B is a graph that illustrates the results of Fourier transform on the spectrum of the multiplexed light beam illustrated in FIG. 26A.

The solid line in the graph of FIG. 6A represents the spectrum of the multiplexed light beam obtained by multiplexing the multiplexed light beam, of which the spectrum is illustrated in FIG. 4, and the multiplexed light beam, of which the spectrum is illustrated in FIG. 5, with the half mirror HM. As illustrated in FIG. 6A, the spectra of the multiplexed light beams multiplexed by the dichroic mirrors DM1 and DM2 complement each other such that the central concavities, which are present therein, are reduced. The spectrum of the ultimately multiplexed light has small concavities and convexities, and is of a smooth, flat shape. The broken lines in the graph of FIG. 6A illustrate the spectra of light beams emitted by the four light sources SLD1 through SLD4. Note that the horizontal axis in the graph of FIG. 6A represents wave numbers, and that the graduations thereof are not equidistant. FIG. 6B is a graph that illustrates the result of Fourier transform of the spectrum illustrated in FIG. 6A from a wave number space to a positional space. Side lobes, which are present in the graph of FIG. 26B that illustrates conventional multiplexing using dichroic mirrors, are not present in the graph of FIG. 6B.

Figure 23:
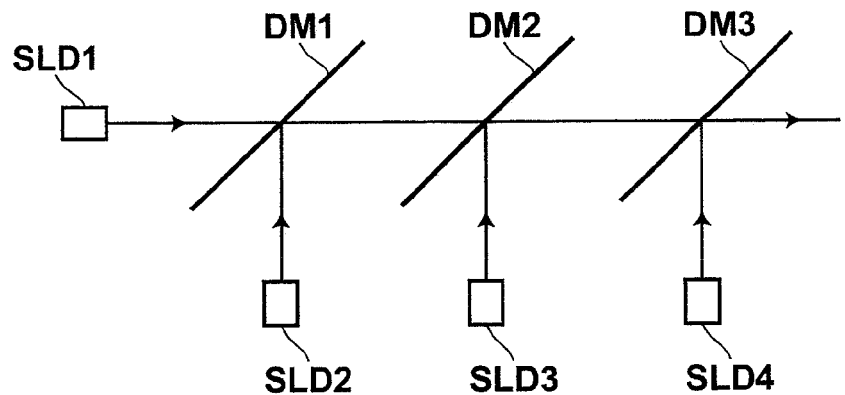
FIG. 23 illustrates the configuration of a conventional light source apparatus.
Figure 24:
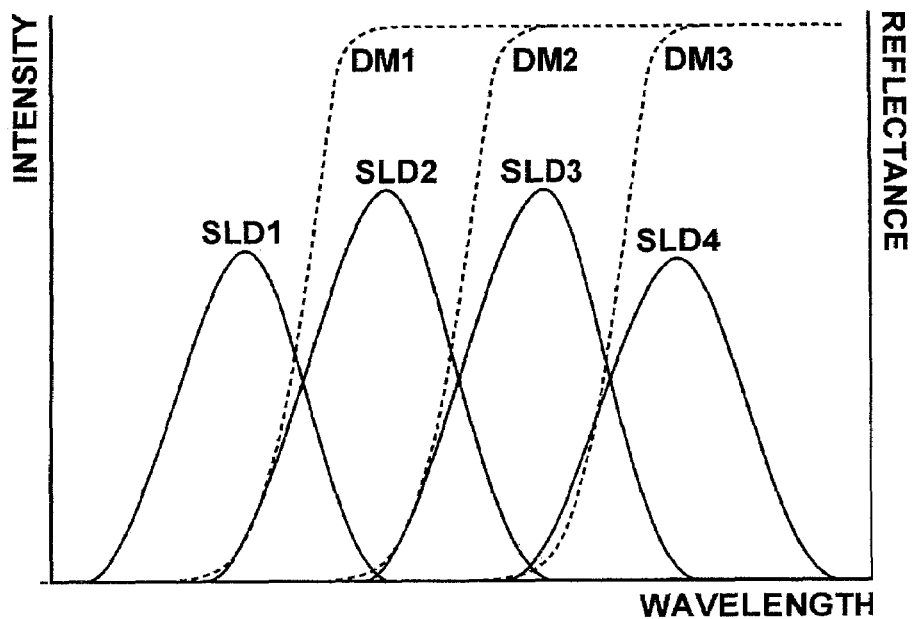
FIG. 24 is a graph that illustrates the spectra of light emitted by the light sources of the light source apparatus of FIG. 23, and wavelength properties of the reflectance of dichroic mirrors thereof.
Figure 25:
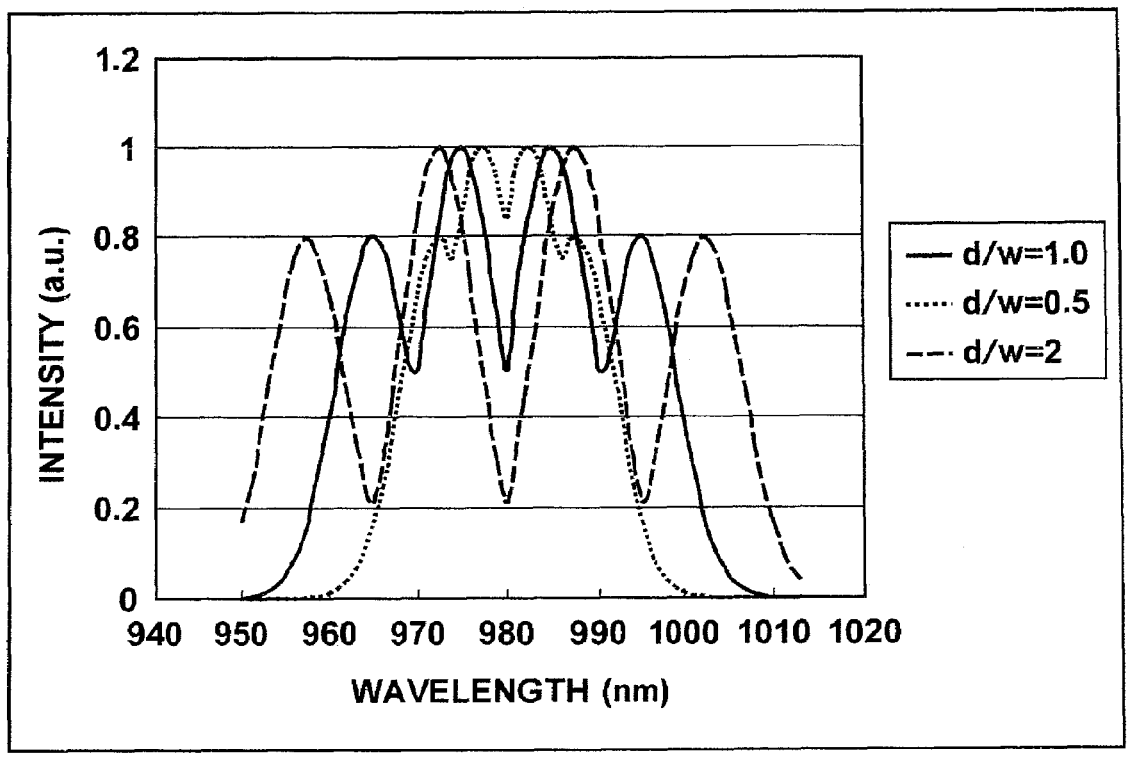
FIG. 25 is a graph that illustrates spectra of multiplexed light beams obtained by the light source apparatus of FIG. 23.
Figure 27:
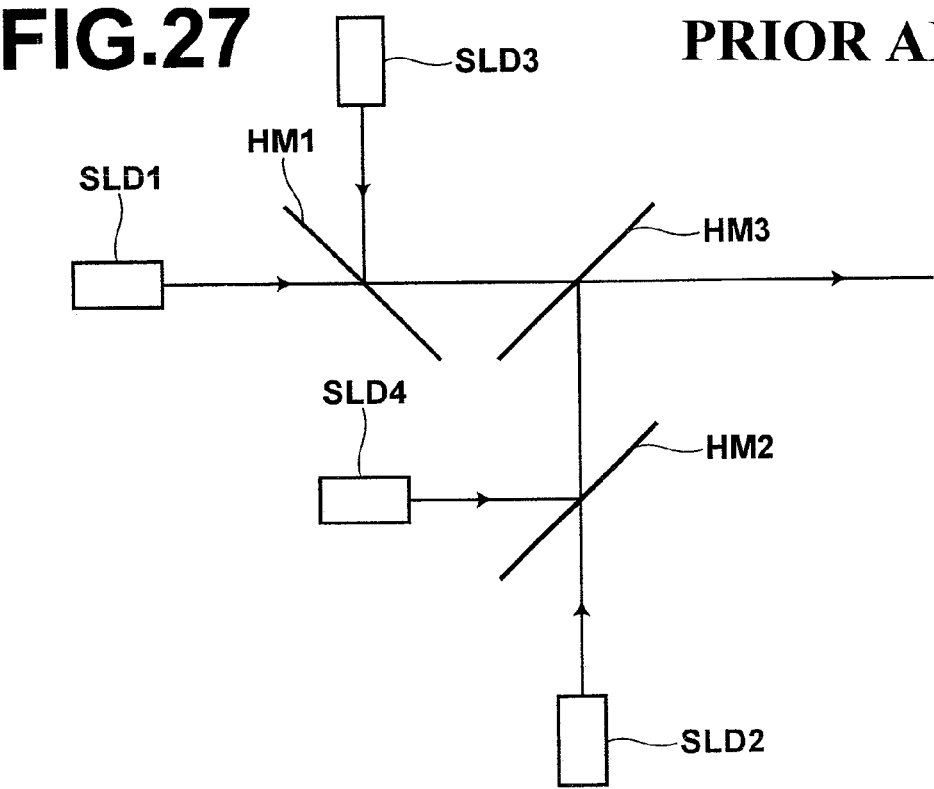
FIG. 27 illustrates the configuration of another conventional light source apparatus.
Figure 28A:
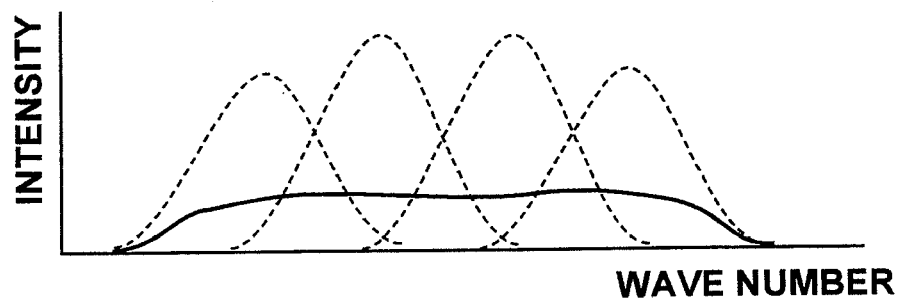
FIG. 28A is a graph that illustrates the spectra of light beams emitted from each of the light sources of the light source apparatus of FIG. 27, and the spectrum of a light beam multiplexed thereby.
Figure 28B:
FIG. 28B is a graph that illustrates the results of Fourier transform on the spectrum of the multiplexed light beam illustrated in FIG. 28A.

FIGS. 6A and 6B are qualitative graphs. However, a detailed comparison employing calculated numerical values will be made among multiplexing by the light source apparatus of the present embodiment illustrated in FIG. 2, conventional multiplexing using dichroic mirrors (hereinafter, referred to as "dichroic mirror multiplexing") illustrated in FIG. 23, and conventional multiplexing using half mirrors (hereinafter, referred to as "half mirror multiplexing") illustrated in FIG. 27.

Figure 7:
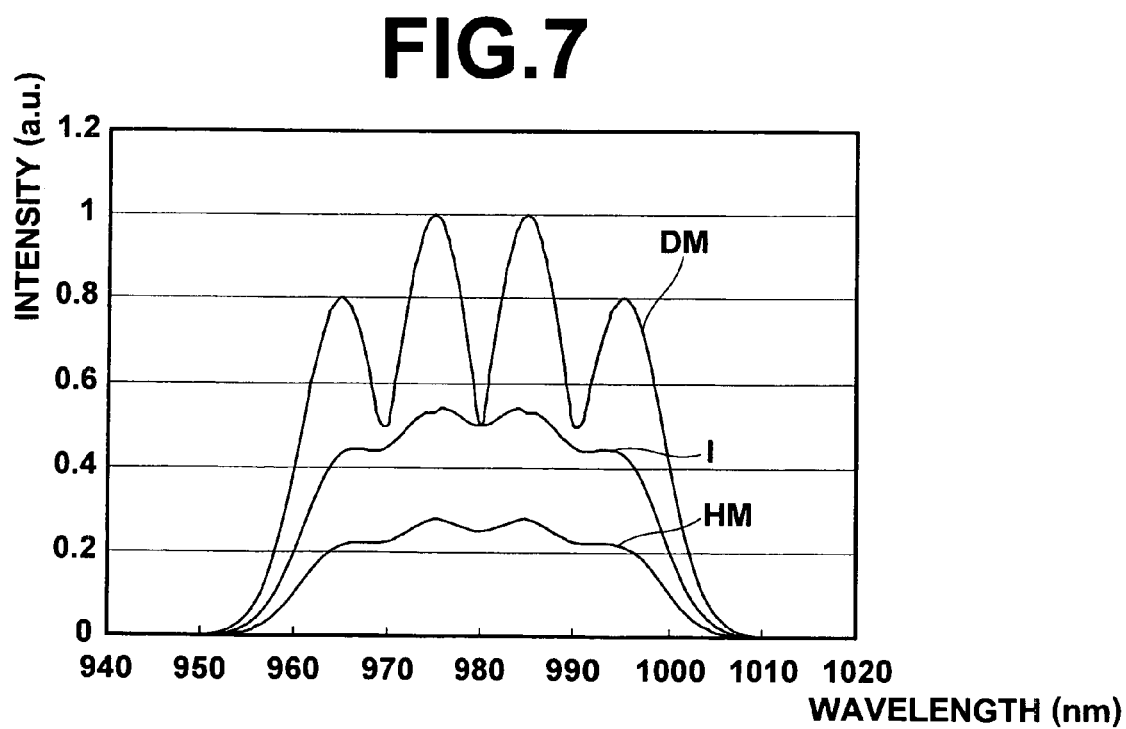
FIG. 7 is a graph that illustrates the spectra of multiplexed light beams obtained by the light source of FIG. 2 and by conventional multiplexing means.

FIG. 7 is a graph that illustrates the calculated numerical spectra of multiplexed light beams obtained by the light source of the present embodiment, by dichroic mirror multiplexing, and by half mirror multiplexing, labeled I, DM, and HM, respectively. In each case, the same four light sources SLD1, SLD2, SLD3, and SLD4 were employed. The full width at half maximum w of each light source is 10 nm, and the interval d between the peak wavelengths of light sources adjacent to each other in the order of the lengths of the central wavelengths is 10 nm.

In actual SD-OCT measurement, Fourier transform is administered on signals which are overlaps of OCT coherent signals on signals based on the spectrum of a measuring light beam. FIGS. 8A through 10B are graphs that illustrate coherent signals, which are overlaps of OCT coherent signals on spectrum signals of each of the multiplexed light beams of FIG. 7, and FT signals, which are the results of Fourier transform on the coherent signals. FIGS. 8A and 8B are graphs in the case of multiplexing by the light source apparatus of the present invention, FIGS. 9A and 9B are graphs in the case of dichroic mirror multiplexing, and FIGS. 10A, and 10B are graphs in the case of half mirror multiplexing. In FIGS. 8A, 8B, 9A, 9B, 10A, and 10B, the graph denoted by A represents the coherent signal, and the graph denoted by B represents the FT signal.

As illustrated in FIGS. 7 through 10, the spectrum of the light beam obtained by dichroic mirror multiplexing has great differences among the concavities and convexities thereof. In contrast, the spectrum of the light beam obtained by the light source of the present embodiment is of a smooth flat shape, similar to that of the light beam obtained by half mirror multiplexing. As a result, small side lobes, on approximately the same order as those present in half mirror multiplexing, are observed in the FT signal of the multiplexed light beam obtained by the light source apparatus of the present embodiment, whereas large side lobes are present in the FT signal of the light beam obtained by dichroic mirror multiplexing.

As described previously, side lobes appear to be the same as components that indicate that a reflective interface is present at a certain depth position, and become noise with respect to reflection data. That is, it is preferable that the side lobes are small, because they cause signals to become unclear and deteriorate resolution. The side lobes observed in the FT signals of the multiplexed light beam obtained by the light source apparatus of the present embodiment are considerably smaller than those observed in the case of dichroic mirror multiplexing. Therefore, higher resolution images can be expected in the case that the light source apparatus of the present embodiment is employed, when compared to cases in which dichroic mirror multiplexing is employed.

In addition, as can be seen from FIGS. 7 through 10, the optical intensity of the light beam multiplexed by the light source apparatus of the present embodiment is approximately twice that of the light beam obtained by half mirror multiplexing. This is because in the half mirror multiplexing illustrated in FIG. 27, light beams emitted from each light source passes through half mirrors, which have large amounts of light loss, twice. In contrast, light beams pass through a half mirror only once in the present embodiment. Accordingly, the optical intensity of the ultimately obtained multiplexed light beam becomes greater as the number of light sources increases in the case that a half mirror is employed to multiplex light beams only once, as in the light source of the present embodiment, when compared against light source apparatuses such as that illustrated in FIG. 27, that employs half mirrors to perform every multiplexing operation.

Note that the spectra of multiplexed light beams are related to the intervals d between peak wavelengths of light sources used for multiplexing, and full widths at half maximum w of each light source. Hereinafter, favorable intervals d between peak wavelengths and full widths at half maximum w for light source apparatuses to be employed in optical tomography imaging apparatuses will be considered, while comparing multiplexing by the light source of the present embodiment, dichroic mirror multiplexing, and half mirror multiplexing. The light sources to be employed in the following examples are the same as the aforementioned light sources SLD1 through SLD4. However, the optical intensity of each light source at its peak wavelength is assumed to be the same, for the sake of simplicity of description.

Figure 11:
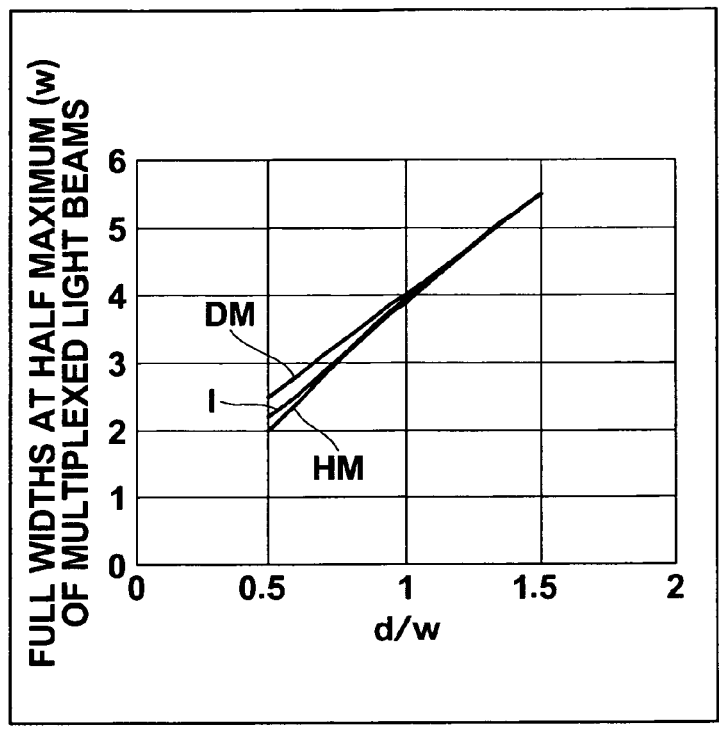
FIG. 11 is a graph that illustrates the full widths at half maximums of light beams ultimately obtained by the light source of FIG. 2 and by conventional multiplexing means.

First, the wavelength interval of the spectrum of a multiplexed light beam, which greatly influences the resolution of optical tomography imaging apparatuses, will be considered. The wavelength interval of the multiplexed light beam increases monotonously, accompanying increases in the intervals between the peak wavelengths of individual light sources. FIG. 11 is a graph that illustrates the full widths at half maximums of light beams ultimately obtained by the light source of the present embodiment, dichroic multiplexing, and half mirror multiplexing, labeled I, DM, and HM, respectively. Note that the horizontal axis of the graph of FIG. 11 represents values of d/w, and the vertical axis represents values of w.

It is preferable for the full width at half maximum of multiplexed light beams to be at least (full width at half maximum of each light source)×(number of light sources). That is, in the case that light beams from four light sources are multiplexed, it is preferable for the full width at half maximum of a multiplexed light beam to be 4 w or greater. Therefore, favorable conditions are d/w≧1 in FIG. 11. Note that the conditional inequality d/w≧1 does not depend on the number of light sources.

Next, the shape of the spectrum of a multiplexed light beam, which influences noise when an optical tomography imaging apparatus obtains signals, will be considered. As described previously, in the case that the spectrum has concavities and convexities, Fourier transform will result in side lobes being present, which deteriorates the resolution, S/N ratio and the like in optical tomography imaging apparatuses. The size of side lobes is proportionate to the depths of concavities within the spectrum. Therefore, it is desirable for the spectrum to be as smooth as possible. That is, it is desirable for the difference between the peak and the bottom of the spectrum of the multiplexed light beam to be small, and desirable for a ratio of optical intensities at the peak and at the bottom (hereinafter, referred to as "p-v ratio") to be close to 1.

The p-v ratio for each case will be determined. First, in conventional half mirror multiplexing, the spectrum of a multiplexed light beam can be represented by the following formula:

$$P(\lambda) = \frac{1}{N}\sum_n e^{\frac{(\lambda - n*d)^2}{(w/2)^2}} \quad (2)$$

Figure 12:
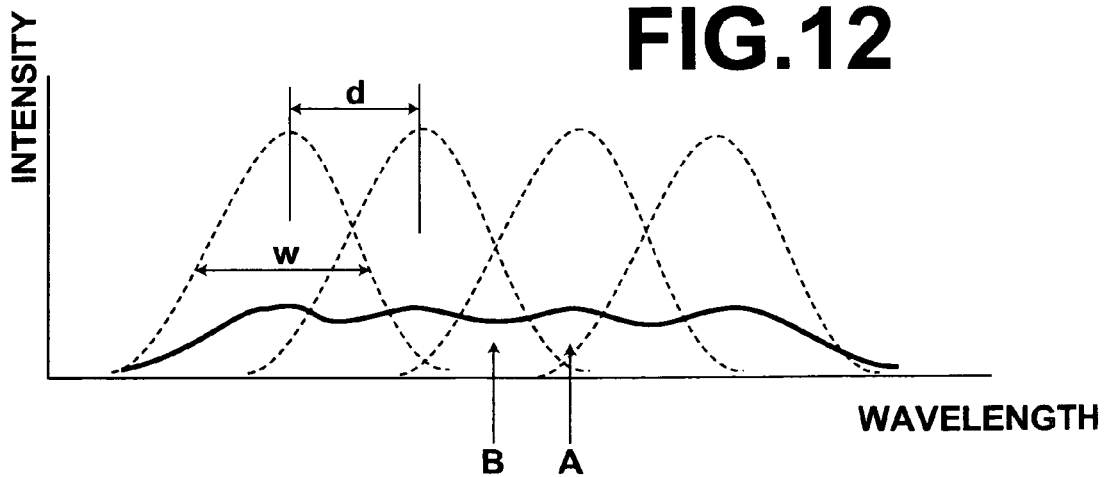
FIG. 12 is a graph that illustrates the peaks and bottoms of a multiplexed light beam.

In the above formula, N represents the number of light sources which are employed in the multiplexing operation, and the split ratio of the half mirror HM is assumed to be 50%. FIG. 12 is a graph that illustrates the spectrum of the light beam multiplexed by half mirror multiplexing with a solid line, and the spectra of each of the multiplexed light sources with broken lines. In half mirror multiplexing, the peaks and bottoms of the spectrum of the multiplexed light beam occur at the peak wavelengths of each light source (indicated by A in FIG. 12) and the midpoints therebetween (indicated by B in FIG. 12). Therefore, the p-v ratio is obtained at these wavelengths according to the above formula.

Meanwhile, the optical intensities at the peaks and bottoms of multiplexed light beams obtained by dichroic multiplexing are equal to the optical intensities of the peak wavelengths and the crossover points thereof, and the p-v ratio is obtained there at.

Figure 13:
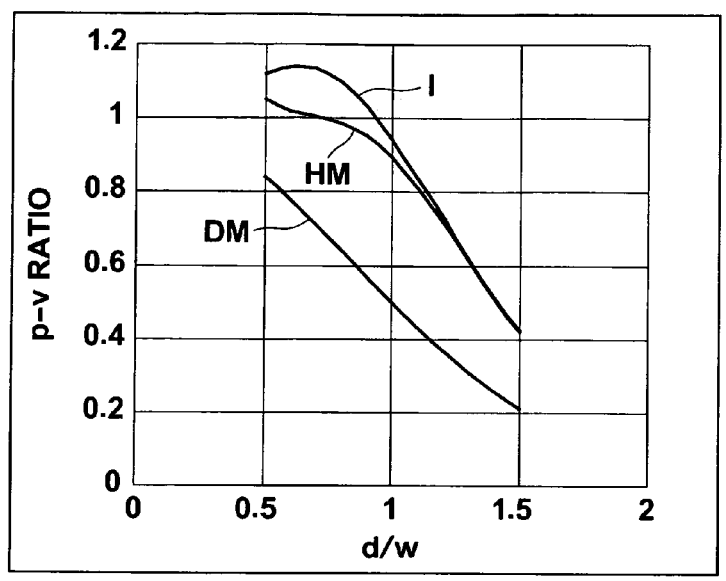
FIG. 13 is a graph that illustrates p-v ratios of light beams ultimately obtained by the light source apparatus of FIG. 2 and by conventional multiplexing means.

FIG. 13 is a graph that illustrates p-v ratios of light beams ultimately obtained by the light source apparatus of the present embodiment, dichroic mirror multiplexing, and half mirror multiplexing, labeled I, DM, and HM, respectively. The horizontal axis of the graph of FIG. 13 represents d/w values. In FIG. 13, it can be seen that the concavities and convexities of the spectrum of the multiplexed light beam obtained by the light source apparatus of the present embodiment are suppressed to approximately half of that obtained by dichroic mirror multiplexing. In the case that the p-v ratio is greater than 1 in half mirror multiplexing, concavities and convexities do not occur, and the spectrum as a whole is single peaked. Where the d/w value is greater than 1, a light beam multiplexed by the light source apparatus of the present embodiment has the same spectrum as that obtained by half mirror multiplexing. However, where the d/w value is less than 1, there are cases in which the shapes of the concavities and convexities are inverted.

Figure 14:
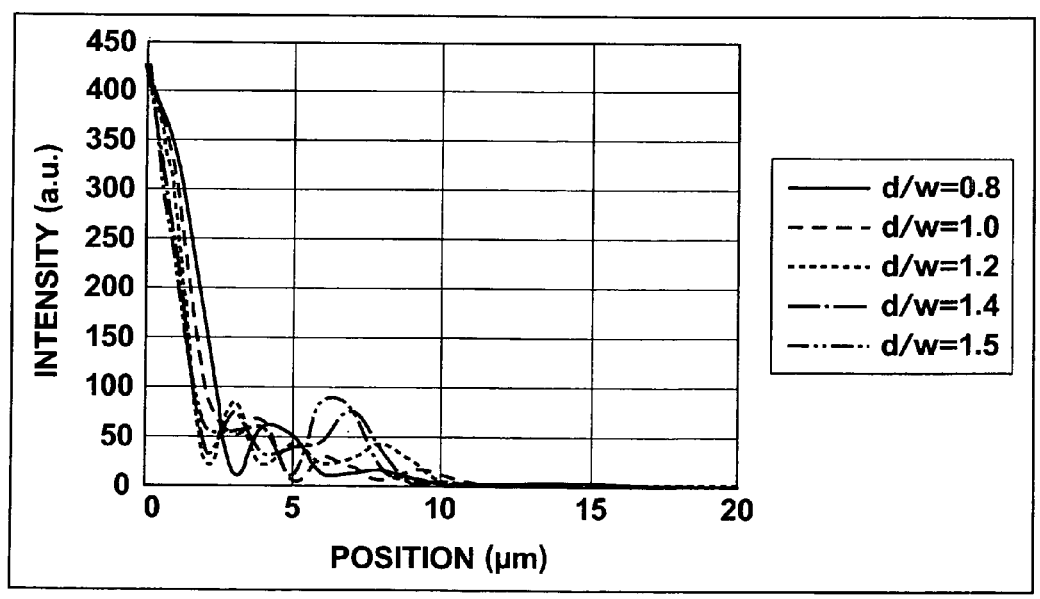
FIG. 14 is a graph that illustrates a portion of results of Fourier transform on a spectrum of light obtained by the light source apparatus of FIG. 2.
Figure 15:
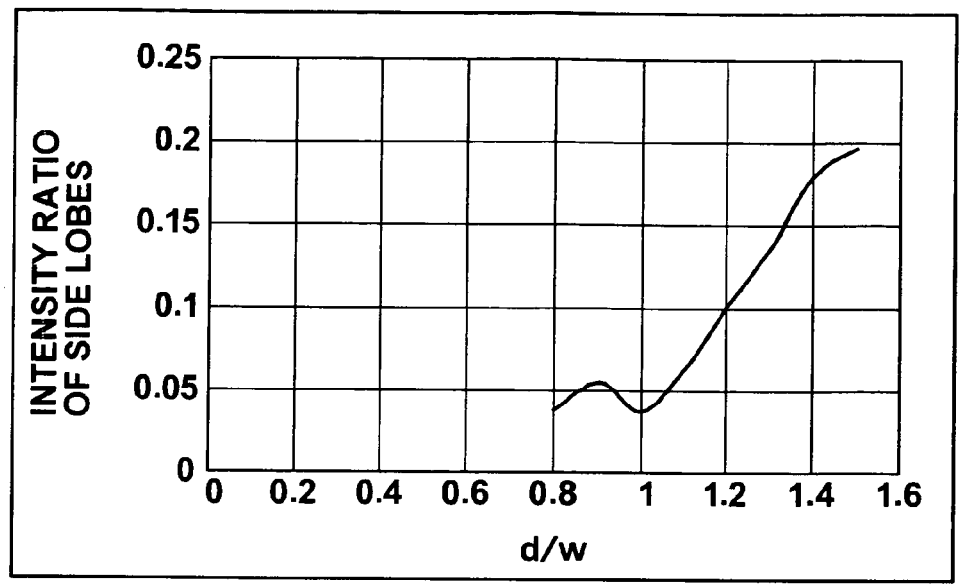
FIG. 15 is a graph that illustrates the intensity ratios of side lobes illustrated in FIG. 14.

SD-OCT apparatuses obtain spatial data by administering Fourier transform on coherent signals, in which OCT coherent signals overlap spectral signals of measuring light beams. Therefore, Fourier transform is administered on the spectrum of the light beam multiplexed by the light source apparatus of the present embodiment, and the main portion thereof is illustrated in the graph of FIG. 14. In actuality, side lobes at the frequency of the coherent signal cause problems. However, the coherent signal overlaps substantially uniformly, and therefore the influence thereof can be eliminated by calculating operations. Accordingly, the side lobes that cause actual problems can be considered to be those in the periphery of a DC component. FIG. 14 illustrates the side lobes in the periphery of the DC component for cases in which the value of d/w is 0.8, 1.0, 1.2, 1.4, and 1.5. It can be seen that the side lobes become greater as the value of d/w increases. Further, FIG. 15 is a graph that illustrates the intensity of the largest side lobe for each case, with the value of d/w as the variable. From the graph of FIG. 15, it can be seen that the value of d/w must be 1.2 or less in order to suppress the side lobes to −10 dB or less.

Figure 16:
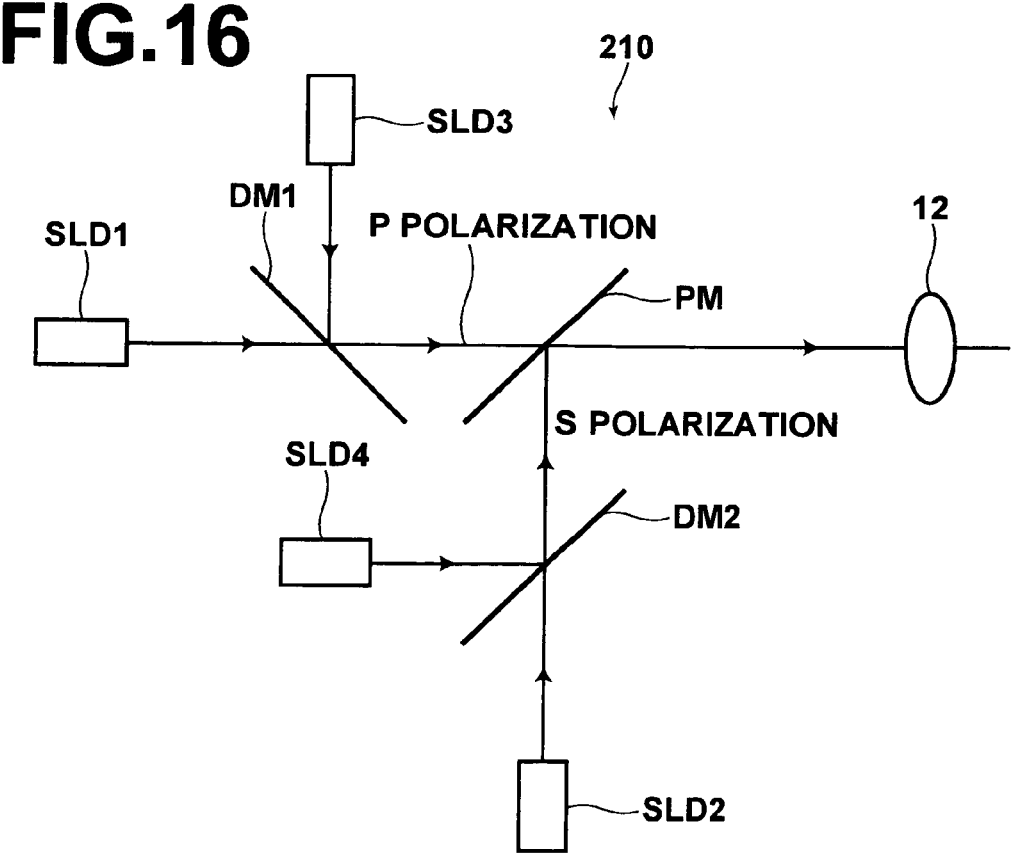
FIG. 16 is a schematic diagram that illustrates the construction of a light source apparatus according to a second embodiment of the present invention.

Next, a light source apparatus 210 according to a second embodiment of the present invention will be described. FIG. 16 is a schematic diagram that illustrates the construction of the light source apparatus 210. Note that elements, which are the same as those of the light source apparatus 10 of the first embodiment, are denoted with the same reference numerals, and detailed descriptions thereof will be omitted insofar as they are not particularly necessary. The light source apparatus 210 differs from the light source apparatus 10 illustrated in FIG. 2 in that the half mirror HM is replaced with a polarizing mirror PM. Light beams from each light source are multiplexed, by setting polarizing directions to match those of the polarizing mirror PM.

The polarizing mirror PM is a plate shaped polarizing beam splitter. The polarizing mirror PM has a surface which is coated with a thin metal film, such as chrome, or with a multiple layered dielectric film. The polarizing mirror PM transmits light beams having a predetermined polarizing direction, and reflects light beams having a polarizing direction perpendicular to the predetermined polarizing direction regardless of the wavelengths thereof, with respect to light beams within the wavelength bandwidth of the light sources. Here, the polarizing mirror PM functions as a multiplexing means not having wavelength selectivity.

In the light source apparatus 210 illustrated in FIG. 16, the light sources SLD1 and SLD3 are provided such that the directions of light beams emitted thereby are perpendicular to each other. The dichroic mirror DM1 is provided at the intersection of the light beams emitted from the light sources SLD1 and SLD3 such that it is disposed at a 45 degree angle with respect to both of the light beams. The light beams emitted from the light sources SLD1 and SLD3 are set to be P-polarized light beams. The reflectance properties of the dichroic mirror DM1 with respect to light incident thereto are as is illustrated in FIG. 3. Accordingly, the light beam emitted by the light source SLD1 passes through the dichroic mirror DM1, while the light beam emitted by the light source SLD3 is reflected by the dichroic mirror DM1 and to have the propagating path thereof deflected 90 degrees. Thereby, the two light beams are multiplexed, propagate along the same optical axis, and enter the polarizing mirror PM.

Similarly, the light sources SLD2 and SLD4 are provided such that the directions of light beams emitted thereby are perpendicular to each other. The dichroic mirror DM2 is provided at the intersection of the light beams emitted from the light sources SLD1 and SLD3 such that it is disposed at a 45 degree angle with respect to both of the light beams. The light beams emitted from the light sources SLD2 and SLD4 are set to be S-polarized light beams. The reflectance properties of the dichroic mirror DM2 with respect to light incident thereto are as is illustrated in FIG. 3. Accordingly, the light beam emitted by the light source SLD2 passes through the dichroic mirror DM2, while the light beam emitted by the light source SLD4 is reflected by the dichroic mirror DM2 to have the propagating path thereof deflected 90 degrees. Thereby, the two light beams are multiplexed, propagate along the same optical axis, and enter the polarizing mirror PM.

The light sources SLD1 through SLD4 and the dichroic mirrors DM1 and DM2 are provided such that the P-polarized light beam multiplexed by the dichroic mirror DM1 and the S-polarized light beam multiplexed by the dichroic mirror DM2 intersect each other perpendicularly. The polarizing mirror PM is provided at the intersection of the multiplexed light beams such that it is disposed at a 45 degree angle with respect to both multiplexed light beams. The light beam multiplexed by the dichroic mirror DM1 passes through the polarizing mirror PM, and the light beam multiplexed by the dichroic mirror DM2 is reflected by the polarizing mirror PM to have the propagating path thereof deflected 90 degrees. Thereby, the two multiplexed light beams are multiplexed. The ultimately multiplexed light beam propagates along a single optical axis, is focused by the optical system 12, and enters the optical fiber FB1.

Multiplexing by the polarizing mirror PM is substantially not accompanied by any light loss. Therefore, the optical intensity of the multiplexed light beam ultimately obtained by the light source apparatus 210 of the second embodiment is approximately twice that obtained by the light source apparatus 10 of the first embodiment. The multiplexed light beam ultimately obtained by the light source apparatus 210 of the second embodiment includes both P-polarized light and S-polarized light. However, in cases that linear polarization is not required, highly efficient multiplexing is enabled by utilizing polarizing mirrors as in the second embodiment.

Note that the polarizing mirror PM of the second embodiment may be replaced by a polarizing prism, which is a cube shaped polarizing beam splitter. Polarizing prisms are rectangular prisms with an inclined surface which is coated with a thin metal film, such as chrome, or with a multiple layered dielectric film. Light beams which enter an incident surface thereof are split into reflected light beams and transmitted light beams by the inclined surface.

Figure 17:
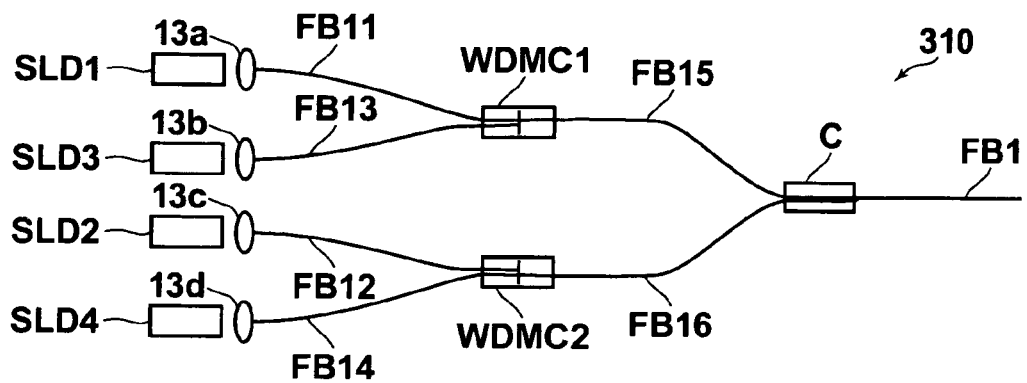
FIG. 17 is a schematic diagram that illustrates the construction of a light source apparatus according to a third embodiment of the present invention.

Next, a light source apparatus 310 according to a third embodiment of the present invention will be described. FIG. 17 is a schematic diagram that illustrates the construction of the light source apparatus 310. Note that elements, which are the same as those of the light source apparatus 10 of the first embodiment, are denoted with the same reference numerals, and detailed descriptions thereof will be omitted insofar as they are not particularly necessary. The light source apparatus 310 differs from the light source apparatus 10 illustrated in FIG. 2 in that: the dichroic mirrors DM1 and DM2 are replaced with WDM (Wavelength Division Multiplexing) couplers WDMC1 and WDMC2; the half mirror HM is replaced with an optical coupler C; and all of the optical paths are constituted by optical fibers.

The WDM couplers WDMC1 and WDMC2 cause light beams of predetermined wavelengths that enter thereinto from predetermined ports to be emitted to predetermined ports. Therefore, the WDM couplers WDMC1 and WDMC2 function as multiplexing means having wavelength selectivity. The optical coupler C multiplexes/demultiplexes a light beam that enters thereinto from a predetermined port by a predetermined ratio regardless of the wavelength thereof. Therefore, the optical coupler C functions as a multiplexing means not having wavelength selectivity. In the third embodiment, the predetermined ratio by which the optical coupler C demultiplexes light beams is 50%:50%.

In the light source apparatus 310 illustrated in FIG. 17, light beams emitted by the light sources SLD1 and SLD3 are focused by optical systems 13a and 13b, and enter optical fibers FB11 and FB13, respectively. The light beams propagate through the optical fibers FB11 and FB13, enter the WDM coupler WDMC1, and are multiplexed thereby. Thereafter, the multiplexed light beam propagates through an optical fiber FB15 and enters the optical coupler C.

Light beams emitted by the light sources SLD2 and SLD4 are focused by optical systems 13c and 13d, and enter optical fibers FB12 and FB14, respectively. The light beams propagate through the optical fibers FB12 and FB14, enter the WDM coupler WDMC2, and are multiplexed thereby. Thereafter, the multiplexed light beam propagates through an optical fiber FB16 and enters the optical coupler C. The light beam, which has been multiplexed by the WDM coupler WDMC1, and the light beam, which has been multiplexed by the WDM coupler WDMC2, are multiplexed by the optical coupler C and enter the optical fiber FB1.

The light source apparatus 310 according to the third embodiment can obtain the same advantageous effects as the light source apparatus 10 of the first embodiment. In the first and second embodiments, multiplexing was performed in open spaces. In contrast, the light source apparatus 310 of the third embodiment employs couplers, to multiplex light beams output by the light sources and input into optical fibers. Thereby, the light source apparatus 310 exhibits a further advantageous effect in that it is superior in stability with respect to environmental changes, compared to the first and second embodiments.

Figure 18:
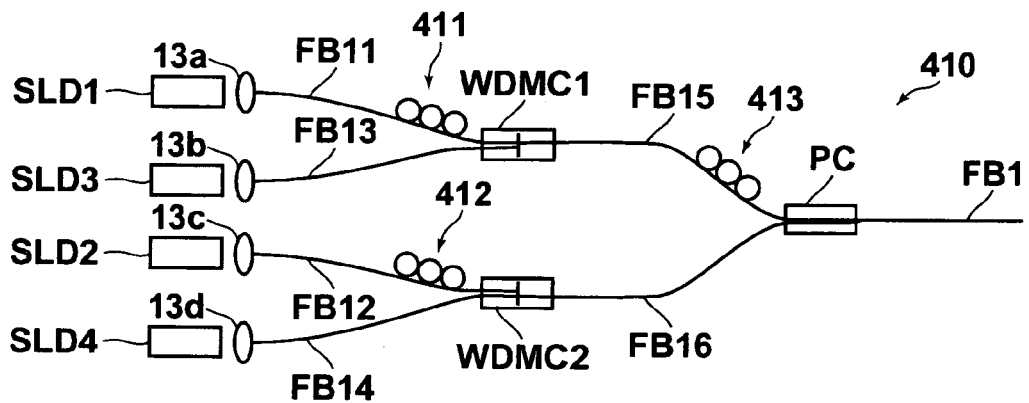
FIG. 18 is a schematic diagram that illustrates the construction of a light source apparatus according to a fourth embodiment of the present invention.

Next, a light source apparatus 410 according to a fourth embodiment of the present invention will be described. FIG. 18 is a schematic diagram that illustrates the construction of the light source apparatus 410. Note that elements, which are the same as those of the light source apparatus 310 of the third embodiment, are denoted with the same reference numerals, and detailed descriptions thereof will be omitted insofar as they are not particularly necessary. The light source apparatus 410 differs from the light source apparatus 310 illustrated in FIG. 17 in that: the polarizing plane controllers 411, 412, and 413 are further provided; and the optical coupler C is replaced by a polarization preserving optical coupler PC. The light source apparatus 410 is configured to multiplex light beams having perpendicular directions of polarization.

The polarizing plane controllers 411, 412, and 413 are capable of converting the polarization states of light beams that propagate through the optical fibers FB11, FB12, and FB15, respectively. The polarization preserving optical coupler PC functions to multiplex or demultiplex light beams that enter thereinto while preserving the polarization states thereof, and multiplexes light beams having perpendicular directions of polarization. A PANDA-PBS (Polarization maintaining AND Absorption reducing Polarization Beam Splitter) may be employed as the polarization preserving optical coupler, for example.

In the light source apparatus 410 illustrated in FIG. 18, light beams emitted by the light sources SLD1 and SLD3 are focused by optical systems 13a and 13b, and enter the optical fibers FB11 and FB13, respectively. The light beams propagate through the optical fibers FB11 and FB13, enter the WDM coupler WDMC1, and are multiplexed thereby. At this time, the polarization plane controller 411 is driven such that the direction of polarization of the light beam emitted by the light source SLD1 matches that of the light beam emitted by the light source SLD3. That is, the direction of polarization of the light beam emitted by the light source SLD1 is set, prior to multiplexing thereof.

Similarly, light beams emitted by the light sources SLD2 and SLD4 are focused by optical systems 13c and 13d, and enter the optical fibers FB12 and FB14, respectively. The light beams propagate through the optical fibers FB12 and FB14, enter the WDM coupler WDMC2, and are multiplexed thereby. At this time, the polarization plane controller 412 is driven such that the direction of polarization of the light beam emitted by the light source SLD2 matches that of the light beam emitted by the light source SLD4. That is, the direction of polarization of the light beam emitted by the light source SLD2 is set, prior to multiplexing thereof.

The light beam, which has been multiplexed by the WDM coupler WDMC1, and the light beam, which has been multiplexed by the WDM coupler WDMC2, propagate through the optical fibers FB5 and FB16, respectively, enter the polarization preserving optical coupler PC, and are multiplexed thereby. At this time, the polarization plane controller 412 is driven to set the direction of polarization of the light beam, which has been multiplexed by the WDM coupler WDMC1, such that it is perpendicular to the direction of polarization of the light beam, which has been multiplexed by the WDM coupler WDMC2. The polarization preserving optical coupler PC preserves the directions of polarization of light beams that enter thereinto. Therefore, the multiplexed light beam ultimately obtained by the polarization preserving optical coupler PC includes light components having perpendicular directions of polarization.

Figure 19:
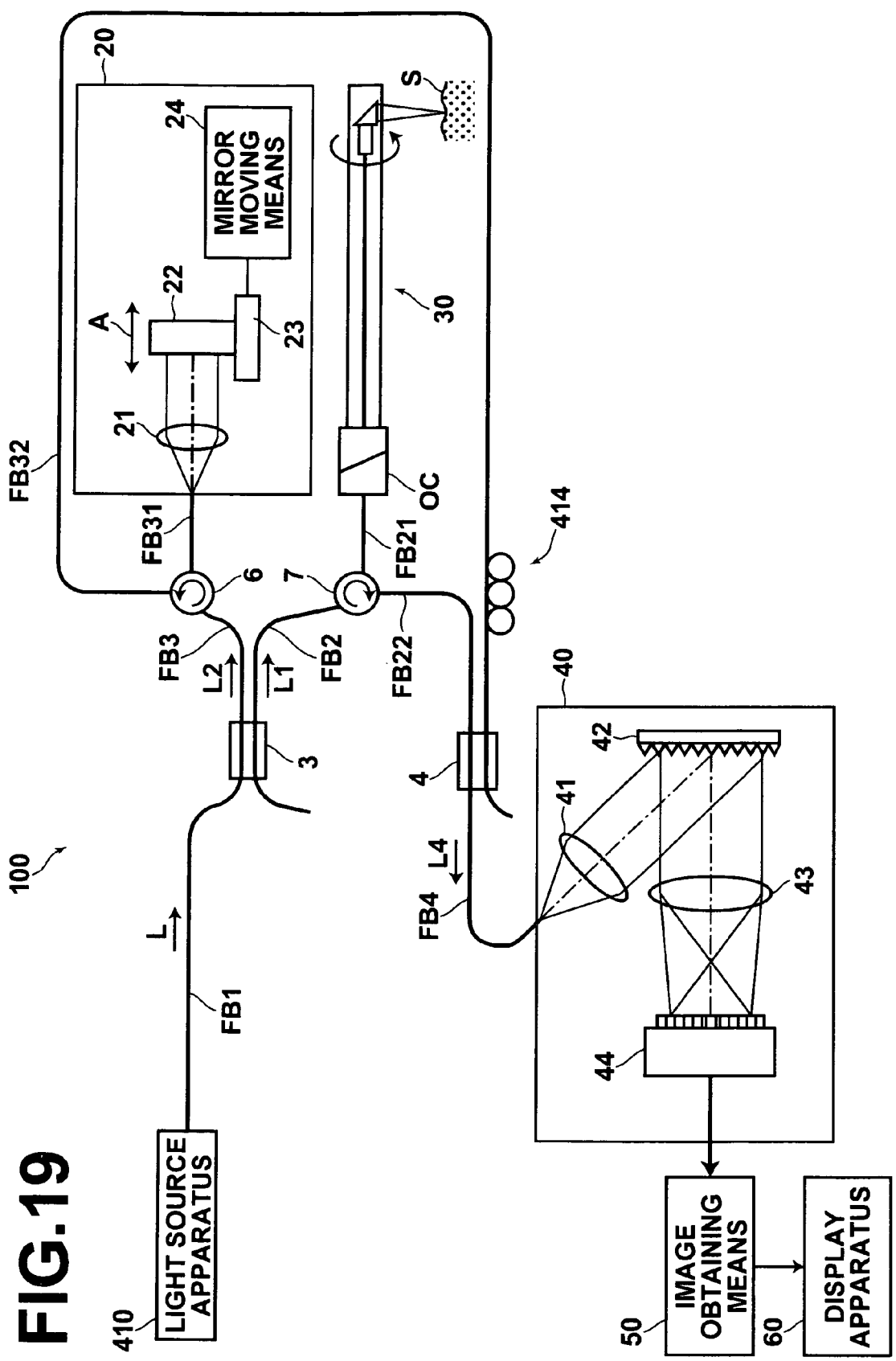
FIG. 19 is a schematic diagram that illustrates the construction of an optical tomography imaging apparatus according to an alternate embodiment of the present invention.

FIG. 19 is a schematic diagram that illustrates the construction of an optical tomography imaging apparatus 100, in which the light source apparatus 410 is incorporated. The optical tomography imaging apparatus 100 obtains tomographic images by SD-OCT measurement employing a Mach-Zehnder interferometer. Note that in FIG. 19, elements which are the same as those of the optical tomography imaging apparatus 1 illustrated in FIG. 1 are denoted with the same reference numerals, and detailed descriptions thereof will be omitted insofar as they are not particularly necessary.

In the optical tomography imaging apparatus 100, a light beam emitted by the light source apparatus 410 and guided by the optical fiber FB1 is divided into the measuring light beam L1 and the reference light beam L2 by the light dividing means 3. The reference light beam L2 passes through a circulator 6, and enters the optical path length adjusting means 20 via an optical fiber FB31. The optical path length of the reference light beam L2 is changed by the optical path length adjusting means 20. Then, the reference light beam L2 propagates through the optical fiber FB31, passes through the circulator 6, propagates through an optical fiber FB32, and enters the multiplexing means 4. A polarization plane controller 414, for setting the direction of polarization of light beams that propagate through the optical fiber FB32, is provided along the optical path of the reference light beam L2.

Meanwhile, the measuring light beam L1 is guided by the optical fiber FB2, passes through a circulator 7, propagates through an optical fiber FB21 and enters the probe 30 via the optical connector OC. The reflected light beam L3 reflected by the measurement target S is emitted from the probe 30, guided by the optical fiber FB21, passes through the circulator 7, propagates through an optical fiber 22, and enters the multiplexing means 4.

At this time, the polarization plane controller 414 is driven to set the direction of polarization the reference light beam L2 such that it is substantially the same as that of the reflected light beam L3, for light beams emitted from each light source. The reflected light beam L3 and the reference light beam L2 are multiplexed to obtain the coherent light beam L4.

The light source apparatus 410 described above can obtain the same advantageous effects as the light source apparatus 310 of the third embodiment. Further, the light source apparatus 410 employs the polarization preserving optical coupler PC instead of the optical coupler C, which multiplexes/demultiplexes light beams at a 50%:50% ratio. Therefore, the light source apparatus 410 can perform more efficient multiplexing.

Note that single mode fibers may be employed as the optical fibers of the light source apparatus 410, if the distance of light propagation therein is short, and stresses are not applied thereto. However, it is preferable for polarization preserving optical fibers, which are capable of preserving polarization states, to be employed. In the case that all of the optical fibers of the light source apparatus 410 are single mode fibers and the polarization states are to be strictly controlled, polarization plane controllers for setting the directions of polarization of light beams that propagate through the optical fibers FB13, FB14, and FB16 may further be provided. Alternatively, a configuration is possible in which no polarization plane controllers are employed. In this configuration, all of the optical fibers of the light source apparatus 410 are polarization preserving optical fibers, and the directions of polarization of light beams emitted from each light source, the directions of the polarizing axes of the polarization preserving optical fibers, and the direction of the polarizing axis of the polarization preserving optical coupler PC are set. PANDA (Polarization maintaining AND Absorption reducing) fibers or oval core fibers, in which the shape of the core is axially asymmetrical, may be employed as the polarization preserving optical fibers.

Figure 20:
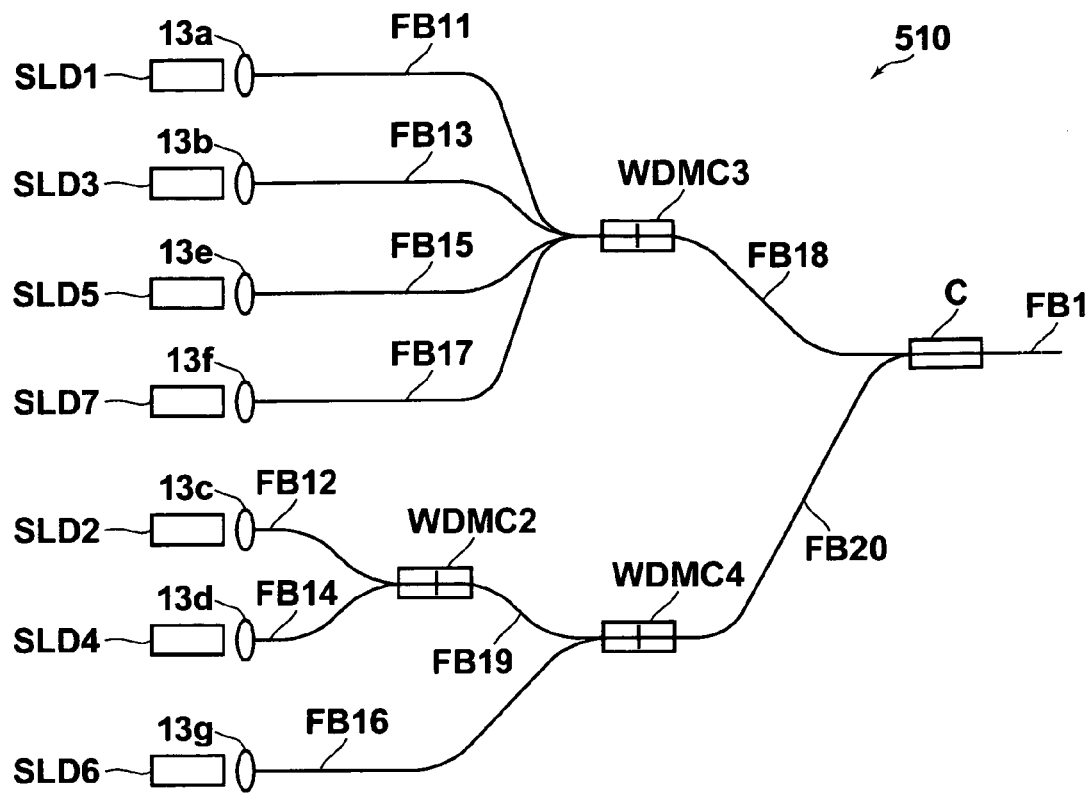
FIG. 20 is a schematic diagram that illustrates the construction of a light source apparatus according to a fifth embodiment of the present invention.

Next, a light source apparatus 510 according to a fifth embodiment of the present invention will be described with reference to FIG. 20. FIG. 20 is a schematic diagram that illustrates the construction of the light source apparatus 510. The light source apparatus 510 has the same basic structure as the light source apparatus 310 illustrated in FIG. 17, except that the number of light sources is increased. In the light source apparatus 510 of the fifth embodiment, WDM couplers and an optical coupler are employed to multiplex light beams emitted by seven light sources SLD1 through SLD7. Each of the light sources SLD1 through SLD7 has a single peaked spectrum with a Gaussian distribution, and the lengths of the central wavelengths thereof increase from the light source SLD1 to the light source SLD7. In addition, the light sources are provided such that the intensities of the light beams emitted therefrom at the peak wavelengths thereof become greater toward the center of the order of the lengths of the central wavelengths.

In the light source apparatus 510 illustrated in FIG. 20, light beams emitted by the light sources SLD1, SLD3, SLD5, and SLD7 are focused by optical systems 13a, 13b, 13e, and 13f and enter optical fibers FB11, FB13, FB15, and FB17 respectively. The light beams propagate through the optical fibers FB11, FB13, FB15, and FB17, enter a WDM coupler WDMC3, which is a 4×1 WDM coupler, and are multiplexed thereby. Thereafter, the multiplexed light beam propagates through an optical fiber FB18 and enters the optical coupler C.

Similarly, light beams emitted by the light sources SLD2 and SLD4 are focused by optical systems 13c and 13d, and enter optical fibers FB12 and FB14, respectively. The light beams propagate through the optical fibers FB12 and FB14, enter the WDM coupler WDMC2, and are multiplexed thereby. Thereafter, the multiplexed light beam propagates through an optical fiber FB19 and enters a WDM coupler WDMC4. A light beam emitted by the light source SLD6 is focused by an optical system 13g, enters the optical fiber FB16, propagates through the optical fiber FB16, and enters the WDM coupler WDMC4. The light beam, which has been multiplexed by the WDM coupler WDMC2, and the light beam emitted by the light source SLD6 are multiplexed by the WDM coupler WDMC4. Thereafter, the multiplexed light beam propagates through an optical fiber 20 and enters the optical coupler C. The light beam, which has been multiplexed by the WDM coupler WDMC3, and the light beam, which has been multiplexed by the WDM coupler WDMC4, are multiplexed by the optical coupler C and enter the optical fiber FB1.

The present invention may be applied to cases in which light beams emitted by a great number of light sources are multiplexed, as in the fifth embodiment. Light beams emitted by any desired number of light sources can be multiplexed, by employing n×1 (wherein n is an integer greater than or equal to 2) WDM couplers, or a great number of WDM couplers.

Note that the multiplexing means is not limited to those described in the first through fifth embodiments. For example, dichroic prisms or diffracting optical elements may be employed as the multiplexing means having wavelength selectivity. Half prisms may be employed as the multiplexing means not having wavelength selectivity. The combinations of the multiplexing means having wavelength selectivity and the multiplexing means not having wavelength selectivity are also not limited to those described in the first through fifth embodiments, and any desired combination may be employed. The light source apparatuses 210, 310, 410, and 510 of the second through fifth embodiments, as well as light source apparatuses employing the above multiplexing means, are also applicable to the optical tomography imaging apparatus 1, similarly to the light source apparatus 10 of the first embodiment.

Figure 21:
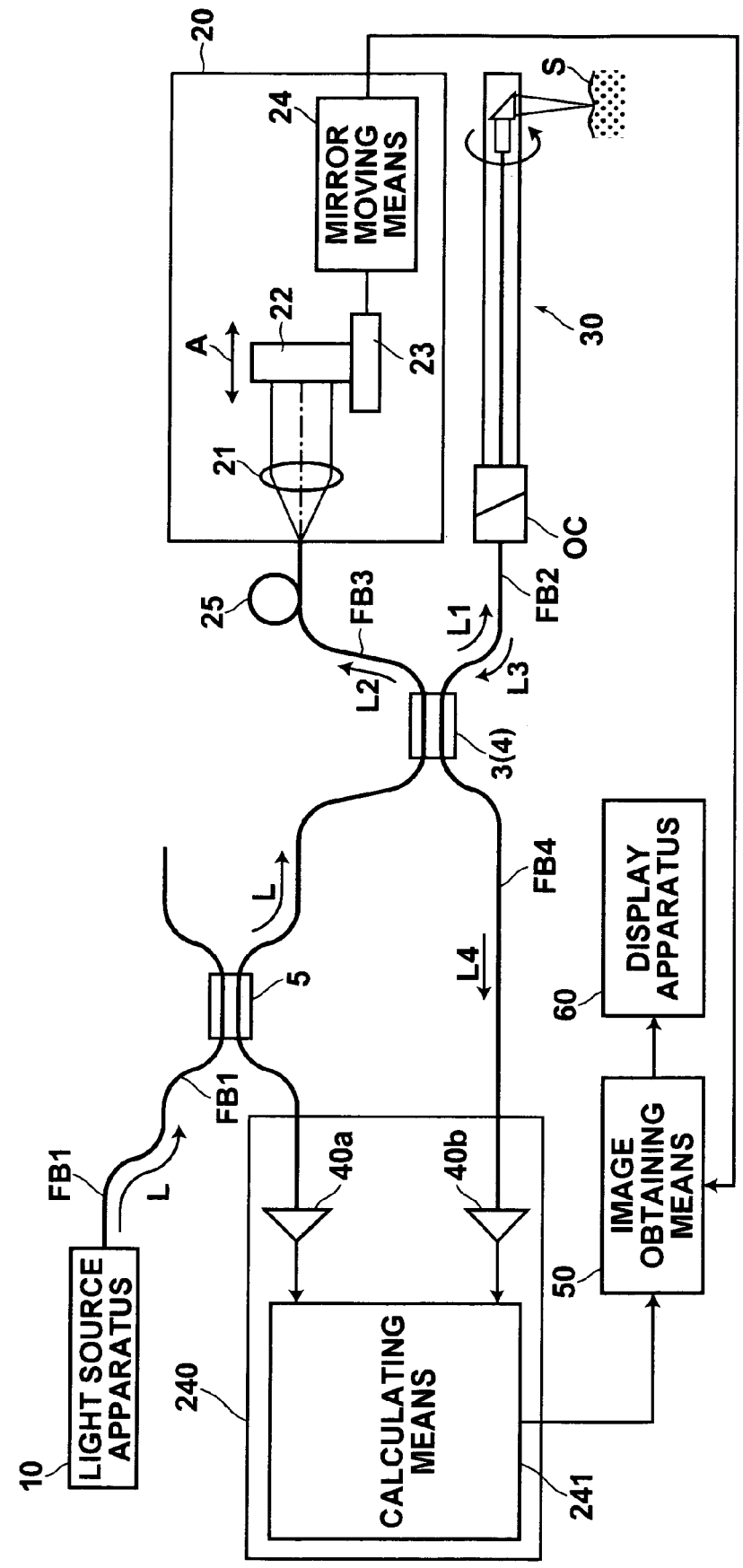
FIG. 21 is a schematic diagram that illustrates the construction of an optical tomography imaging apparatus according to another alternate embodiment of the present invention.

Optical tomography apparatuses that employ SD-OCT measurement have been described above. The light source apparatuses of the present invention may be applied to optical tomography apparatuses that employ TD-OCT measurement as well. FIG. 21 is a schematic diagram that illustrates the construction of an optical tomography imaging apparatus 2 that employs TD-OCT measurement. Note that elements, which are the same as those of the optical tomography imaging apparatus 1 of FIG. 1, are denoted with the same reference numerals, and detailed descriptions thereof will be omitted insofar as they are not particularly necessary.

The optical tomography imaging apparatus 2 obtains tomographic images by performing so called TD-OCT measurement. The optical path length adjusting means 20 functions to change the optical path length of the reference light beam L2, in order to vary measuring positions within the measurement target S in the depth direction thereof. Further, a phase modulator 25 is provided along the optical path (the optical fiber FB3) of the reference light beam L2. The phase modulator 25 functions to slightly shift the frequency of the reference light beam L2. The reference light beam L2. The reference light beam L2, of which the optical path length has been changed by the optical path length adjusting means 20 and the frequency has been shifted by the phase modulator 25, is guided to the multiplexing means 4.

The coherent light detecting means 240 of the optical tomography imaging apparatus 2 detects the intensity of the coherent light beam L4, which is the reflected light beam L3 and the reference light beam L2 multiplexed by the multiplexing means 4, by heterodyne detection, for example. Specifically, a coherent signal having an amplitude proportionate to the amount of reflected light is detected only in cases in which the difference between the sum of the optical path lengths of the measuring light beam L1 and the reflected light beam L3, which is reflected at a point within the measurement target S or back scattered, and the optical path length of the reference light beam L2 is less than the coherence length of the light beam emitted by the light source apparatus 10. As the optical path length of the reference light beam L2 is varied by the optical path length adjusting means 20, the measurement position (depth) within the measurement target S changes. The coherent light detecting means 240 detects reflectance signals at each measuring position. Note that data regarding the measuring position is output to the image obtaining means 50 from the optical path adjusting means 20. Data regarding the distribution of reflected light intensity in the depth direction of the measurement target S is obtained by the image obtaining means 50, based on the data regarding the measuring position output by the optical path length adjusting means 20 and the signals detected by the coherent light detecting means 240.

Note that the optical tomography imaging apparatus 2 illustrated in FIG. 21 comprises photodetectors 40a and 40b. The coherent light beam L4 is split into two light beams by the light dividing means 3 and guided to the two photodetectors 40a and 40b, to perform balanced detection. Thereby, influence by fluctuations in optical intensities can be suppressed, and accurate images can be obtained.

Note that the light source apparatus 10 is illustrated in FIG. 21. Alternatively, the light sources 210, 310, 410, and 510 of the second through fifth embodiments, or light source apparatuses employing the aforementioned multiplexing means may be utilized in the optical tomography imaging apparatus 2.

Figure 22:
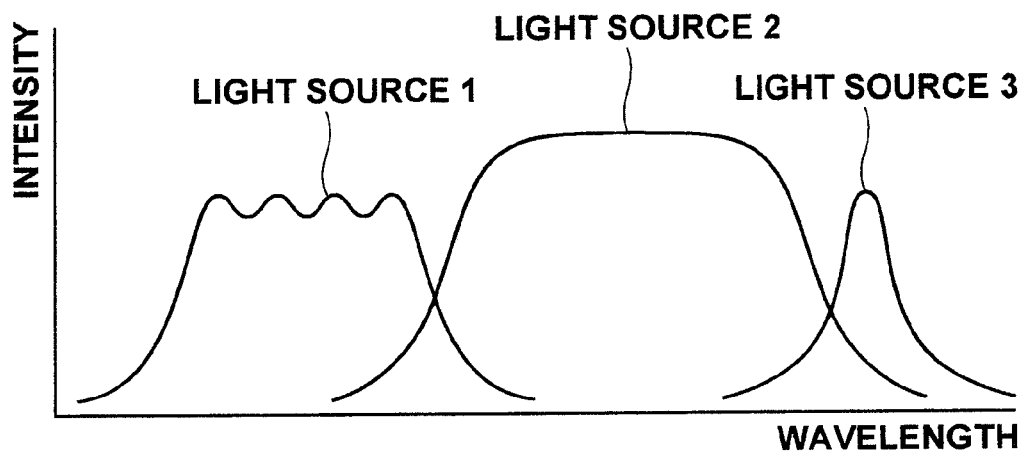
FIG. 22 is a graph that illustrates examples of spectra of light beams emitted by light sources, to which the present invention may be applied.

Note that the present invention is not limited to the embodiments described above. For example, in the embodiments, cases were described in which the intervals among peak wavelengths of light beams to be multiplexed are equal. However, it is not necessary for the intervals among peak wavelengths to be equal. In addition, the present invention may be applied to cases in which light beams emitted from light sources having different spectra, such as those illustrated in FIG. 22, are multiplexed. Further, the number of light sources to be employed in multiplexing is not limited to those described in the embodiments. Any desired number of three or greater may be set as the number of light sources to be provided.

What is claimed is:

1. A light source apparatus, comprising:

at least three light sources each having a predetermined wavelength interval and different central wavelengths;

at least one multiplexing means having wavelength selectivity, for multiplexing light beams emitted from each of a first group and a second group of the light sources, the first group of light sources including odd ordered light sources and the second group of light sources including even ordered light sources when counted in order of lengths of the central wavelengths thereof; and multiplexing means not having wavelength selectivity, for multiplexing light beams emitted from the first group of light sources and light beams emitted from the second group of light sources.

2. A light source apparatus as defined in claim 1, wherein:

the spectrum of the light beam emitted by each of the light sources is single peaked; and the full widths at half maximum (w) of the emitted light beams and intervals (d) between the peak wavelengths of two light sources which are adjacent to each other in the aforementioned order satisfy the relationship:

$$1 \leq d/w \leq 1.2.$$

3. A light source apparatus as defined in claim 1, wherein:

the multiplexing means having wavelength selectivity is one of a dichroic mirror, a dichroic prism, a diffracting optical element, and a WDM coupler.

4. A light source apparatus as defined in claim 1, wherein:

the multiplexing means not having wavelength selectivity is one of a half mirror, a half prism, a polarizing mirror, a polarizing prism, and an optical coupler.

5. A light source apparatus as defined in claim 1, wherein:

the multiplexing means not having wavelength selectivity multiplexes light beams having perpendicular directions of polarization.

6. A light source apparatus as defined in claim 1, wherein:

the light sources are provided such that the intensities of the light beams emitted from the light sources at the peak wavelengths thereof become greater toward the center of the order in which they are counted and arranged.

7. An optical tomography imaging apparatus, comprising:

a light source apparatus;

light dividing means, for dividing a light beam emitted from the light source apparatus into a measuring light beam and a reference light beam;

multiplexing means, for multiplexing a reflected light beam, which is the measuring light beam reflected by a measurement target, and the reference light beam, to obtain a coherent light beam;

coherent light detecting means, for detecting the coherent light beam obtained by the multiplexing means; and image obtaining means, for obtaining tomographic images of the measurement target, based on the coherent light beam detected by the coherent light detecting means;

wherein the light source apparatus comprises:

at least three light sources each having a predetermined wavelength interval and different central wavelengths;

at least one multiplexing means having wavelength selectivity, for multiplexing light beams emitted from each of a first group and a second group of the light sources, the first group of light sources including odd ordered light sources and the second group of light sources including even ordered light sources when counted in order of lengths of the central wavelengths thereof; and multiplexing means not having wavelength selectivity, for multiplexing light beams emitted from the first group of light sources and light beams emitted from the second group of light sources.

* * * * *